United States Patent [19]
Hasushita et al.

[11] Patent Number: 5,345,285
[45] Date of Patent: Sep. 6, 1994

[54] VIEW FINDER AND CAMERA HAVING SAME

[75] Inventors: Sachio Hasushita, Tokyo; Toshiaki Ueda, Urawa; Masahiro Hayakawa, Tokyo, all of Japan

[73] Assignee: Asahi Kogaku Kogyo Kabushiki Kaisha, Tokyo, Japan

[21] Appl. No.: 97,927

[22] Filed: Jul. 28, 1993

Related U.S. Application Data

[63] Continuation of Ser. No. 672,901, Mar. 21, 1991, abandoned.

[30] Foreign Application Priority Data

Mar. 22, 1990 [JP] Japan .................. 2-73126
Jun. 22, 1990 [JP] Japan ................. 2-164481

[51] Int. Cl.$^5$ .............................................. G03B 17/02
[52] U.S. Cl. ...................................... 354/159; 354/222
[58] Field of Search ................. 354/195.12, 222, 94, 354/159

[56] References Cited

U.S. PATENT DOCUMENTS

| | | | |
|---|---|---|---|
| Re. 32,797 | 12/1988 | Harvey | 354/195.1 |
| 2,295,801 | 9/1942 | Nagel | 354/219 |
| 3,534,672 | 10/1977 | Ono | 95/44 |
| 3,619,202 | 6/1970 | Bellows | 95/44 C |
| 4,171,887 | 10/1979 | Hayata | 354/126 |
| 4,249,812 | 2/1981 | Hall | 354/222 |
| 4,251,149 | 2/1981 | Kimura | 354/222 |
| 4,357,102 | 11/1982 | Taren et al. | 355/77 |
| 4,583,831 | 4/1986 | Harvey | 354/219 |
| 4,652,104 | 3/1987 | Harvey | 354/222 |
| 4,655,570 | 4/1987 | Jaffe | 354/219 |
| 4,944,030 | 7/1990 | Haraguchi et al. | 354/403 |
| 4,967,219 | 10/1990 | Morisawa et al. | 354/199 |
| 5,010,357 | 4/1991 | Misawa | 354/159 |
| 5,066,971 | 11/1991 | Kodaira | 354/159 |
| 5,068,678 | 11/1991 | Mogamiya et al. | |
| 5,081,480 | 1/1992 | Abe | |
| 5,086,311 | 2/1992 | Naka et al. | 354/195.1 |
| 5,111,227 | 5/1992 | Ogawa | |
| 5,159,372 | 10/1992 | Nomura et al. | |
| 5,192,648 | 3/1993 | Burnham | 354/159 |

FOREIGN PATENT DOCUMENTS

| | | |
|---|---|---|
| 0550884 | 7/1993 | European Pat. Off. |
| 1597328 | 7/1971 | Fed. Rep. of Germany |
| 571645 | 9/1945 | United Kingdom |
| 690309 | 4/1953 | United Kingdom |
| 847990 | 9/1960 | United Kingdom |
| 1001556 | 8/1965 | United Kingdom |
| 1170853 | 11/1969 | United Kingdom |
| 1582057 | 12/1980 | United Kingdom |
| 2144865 | 3/1985 | United Kingdom |
| 2158955 | 11/1985 | United Kingdom |
| 2171528 | 8/1986 | United Kingdom |
| 2241072 | 8/1991 | United Kingdom |

OTHER PUBLICATIONS

Copy of British Search Report, Application No. 9106107.1, Jul. 26, 1991.

*Primary Examiner*—David M. Gray
*Attorney, Agent, or Firm*—Sandler, Greenblum & Bernstein

[57] ABSTRACT

A camera is provided having a view finder that includes a field frame varying mechanism for varying the ratio length between the longitudinal and lateral sides of a field of frame of the finder. An aperture varying mechanism is provided for varying the physical size of an aperture for exposure of a film in accordance with the ratio of field frame side lengths.

30 Claims, 18 Drawing Sheets macro (70mm)

28~70mm panorama (28mm)

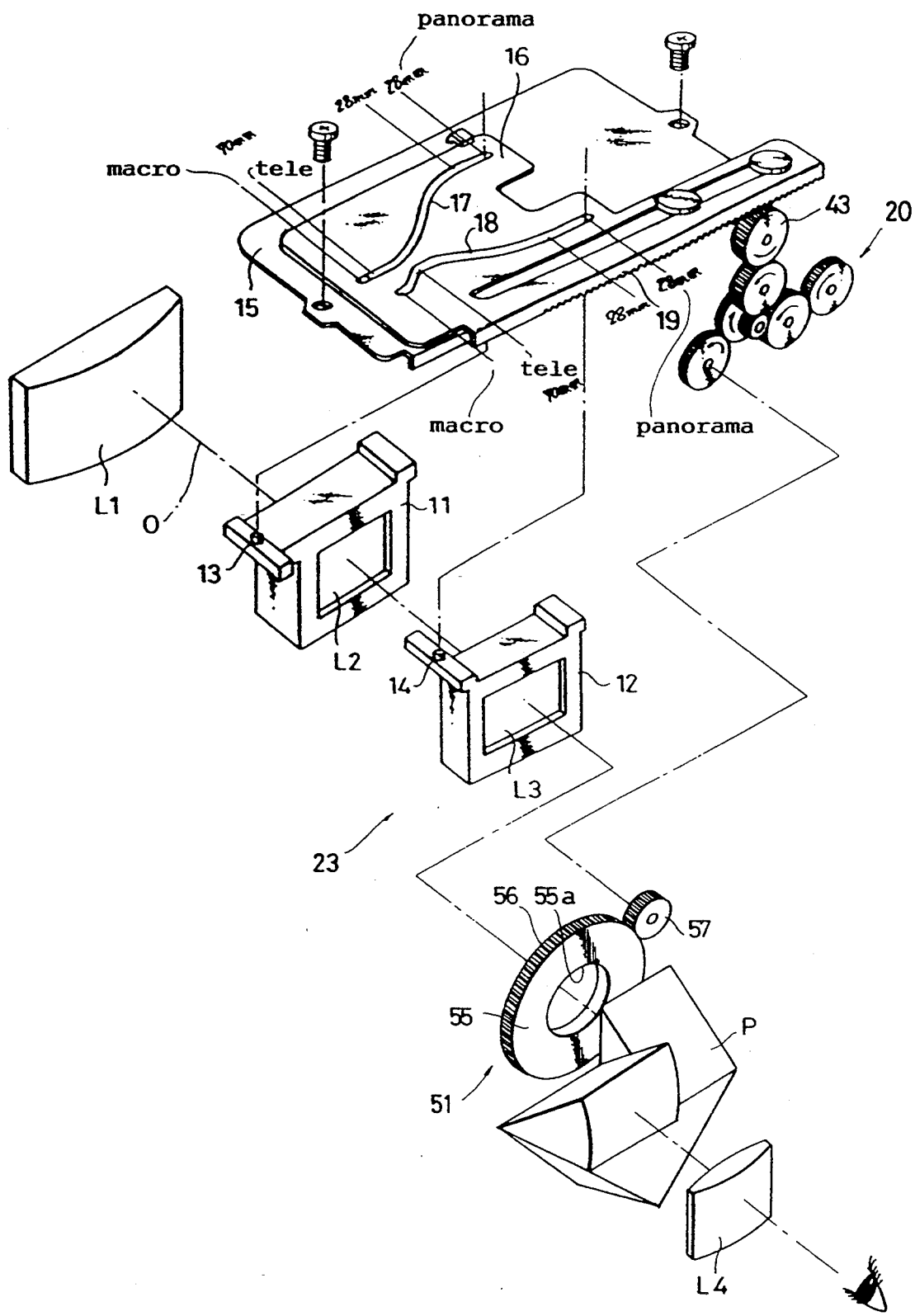

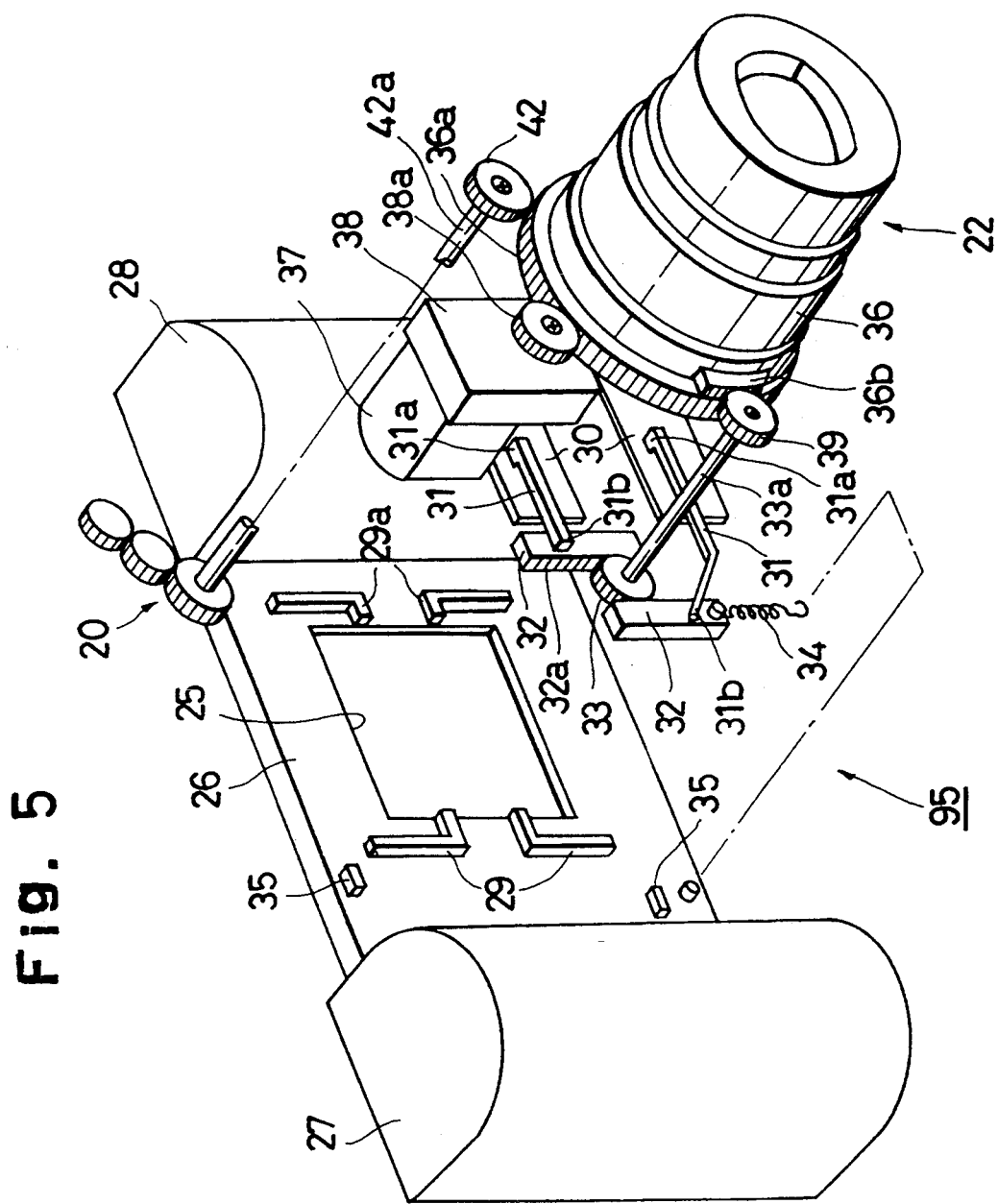

| field frame : | variable | constant |
| image magnification: | constant | variable |

| field frame : | constant | variable |
| image magnification: | variable | constant |

| field frame : | constant | change | constant |
| image magnification: | variable | change | variable |

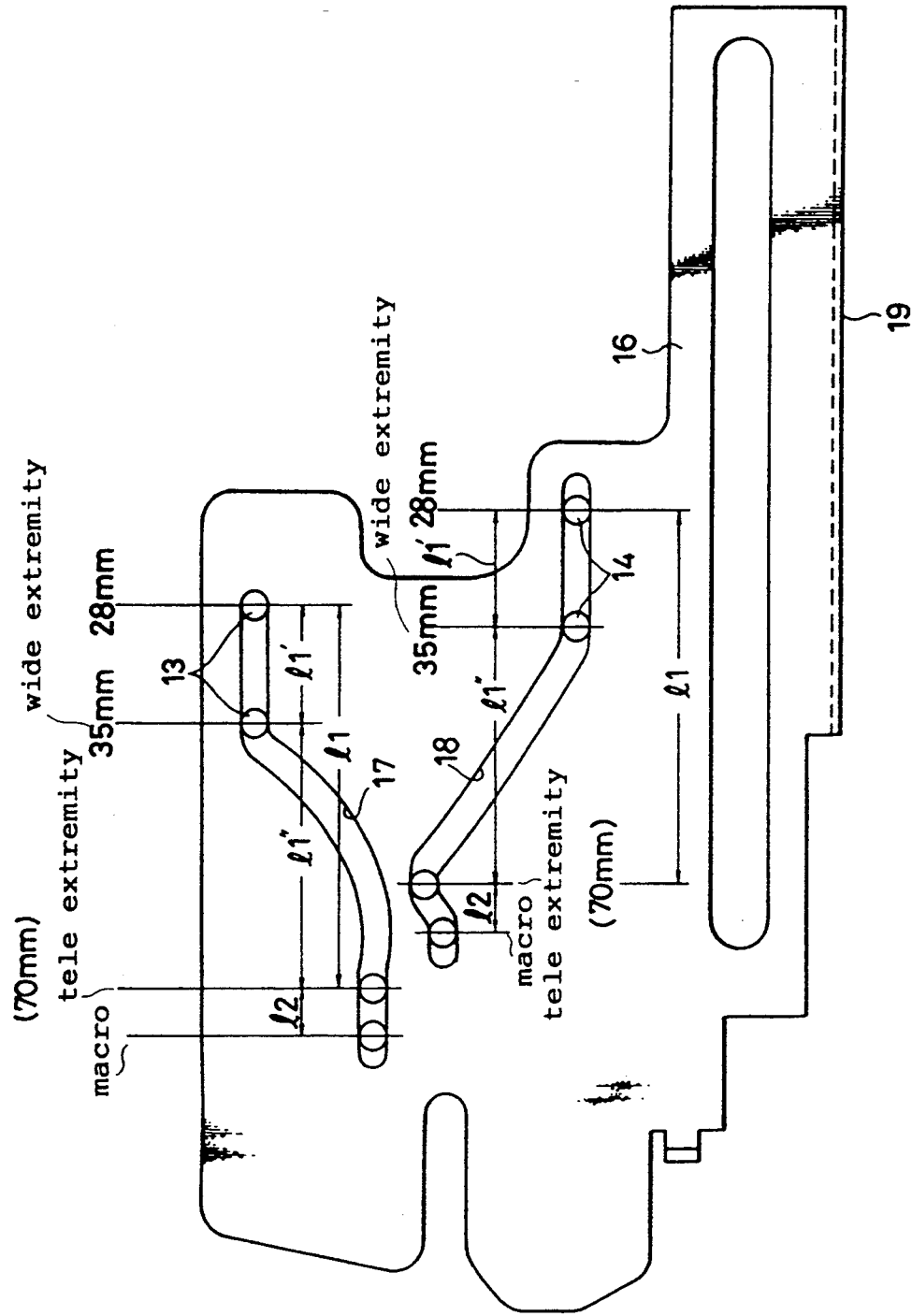

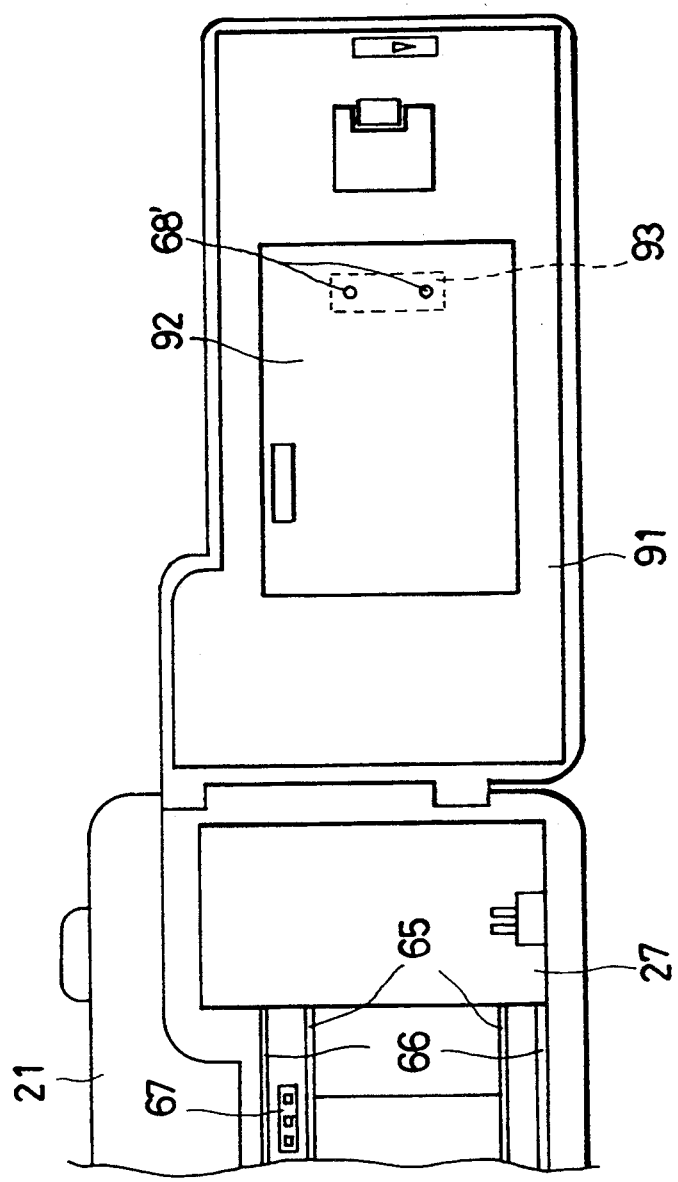

VIEW FINDER AND CAMERA HAVING SAME

This is a continuation of Ser. No. 672,901 filed on Mar. 21, 1991 now abandoned.

BACKGROUND OF THE INVENTION

1. Field of the Invention

The present invention relates to a view finder of a camera, and more particularly to a view finder of a camera in which a normal shot and a panoramic shot can be selectively taken.

Furthermore, the present invention relates also to a novel view finder of a zoom lens camera.

2. Description of Related Art

The size of a frame of a film in a camera is usually determined by the size of a photographing aperture provided immediately before a path of the film in a camera body. In other words, the whole aperture (frame) can be used to form an image. On the other hand, in the panoramic shot to which the subject of the present invention is directed, the upper and lower areas of a certain width of the film frame are not used to form a picture in order to obtain an laterally elongated printed picture. It is possible to obtain a similar picture, i.e., a laterally elongated picture by printing a film frame of a normal shot which is cut to remove the upper and lower areas of a certain width of the film frame. The distinction between the panoramic shot and the normal shot depends on a photographer's intention when taking the picture. Namely, in the panoramic shot mode, the photographer must be aware of the upper and lower areas (which will be referred to as non-picture areas) of a certain width of the film frame.

In a camera having such a panoramic shot mode, it is necessary to indicate the photographing range of the panoramic shot in the field of view of the finder, in addition to the photographing range of the normal shot. To this end, in a conventional view finder, two horizontal frame lines which are located apart from the upper and lower edges of the normal frame at a predetermined distance are drawn in the field of view to define the photographing range of the panoramic shot. Accordingly, upon taking a picture of a normal shot, the photographer observes the whole field of view of the finder while neglecting the photographing range of the panoramic shot. On the other hand, upon taking a panoramic picture in the panoramic shot mode, the photographer observes the field of view of the finder, while carefully looking at the two frame lines therein.

However, the two frame lines may spoil the view of the photographer, which may adversely influence the shot. Furthermore, upon taking the panoramic shot, although the photographer theoretically understands that a picture of an image is defined by the space between the two frame lines, it is sometimes difficult for the photographer to visualize the limitations of this space.

Changing to another aspect, in a zoom lens camera in which both the photographing lens system and the finder optical system are automatized to zoom, the field of view of the finder is usually varied in accordance with the photographing range. In a conventional mechanism for varying the field of view, in principle, variable power lens groups are moved in the optical axis direction in association with the zooming operation of the zoom lens system to vary the field of view. Namely, the finder magnification (power) decreases as the focal length of the zoom lens system decreases in order to change the field of view from a narrow field to a wide field.

However, in such a zoom finder device in which the finder magnification merely varies in accordance with the focal length of the zoom lens, it is doubtful that the photographer is fully aware of the photographable range.

For instance, if the magnification is decreased to realize an increased wide angle, an image within the finder becomes too small to observe, rendering the photographer unable to recognize the wide angle from the image.

SUMMARY OF THE INVENTION

The primary object of the present invention is to provide a view finder of a camera in which an image of an object within a field frame of the finder can be indicated to be similar to a photographed picture even in the panoramic shot mode.

Another object of the present invention is to provide a zoom finder of a camera in which the photographing lens system and the finder optical system are automatized to zoom, wherein the photographing range can be clearly and precisely indicated.

In order to achieve the object mentioned above, according to the present invention, there is provided a camera having a view finder comprising a field frame varying mechanism for varying the ratio in length between the longitudinal and lateral sides of a field of frame of the finder.

In an embodiment of the present invention, the provision is made to an aperture varying mechanism for varying the physical size of an aperture for exposure of a film, in accordance with the ratio in length between longitudinal and lateral sides of a finder field frame.

The field frame varying mechanism varies the ratio in length between the longitudinal and lateral sides of the finder field frame, as in the photographing range in the panoramic shot mode.

According to an aspect of the present invention, the field frame varying mechanism comprises a pair of field frame plates which move together to define the field of view of the finder, and a drive mechanism which varies the ratio in length between the longitudinal and lateral sides of the field of view which is defined by the field frame plates.

By the relative movement of the movable field frame plates, the size (shape) of the finder field frame is varied to correspond to the normal shot and the panoramic shot.

According to another aspect of the present invention, the camera comprises an aperture varying mechanism which selectively determines a normal field of view which represents a normal photographing range and a panoramic field of view which has a contracted lateral side length and represents a panoramic photographic range.

It is preferable to correspond the photographing range to the finder field of view in the panoramic shot mode. The term "preferable", here, means that this correspondence is not always necessary. In other words, even if the photographing range of the film does not meet the finder field of view, that is, even if a picture is taken in the normal whole photographing frame of the film in the panoramic shot mode, an elongated panoramic photograph can be obtained by designating a specific frame which should be enlarged into a panoramic picture.

To this end, in regard to yet another aspect of the present invention, and in place of the above-mentioned aperture varying mechanism, there is provided a camera comprising a photographing optical system for forming an image of light transmitted through a photographing lens group onto a film, and a compulsive exposure mechanism for compulsively exposing specific upper and lower portions of a frame of the film.

The mechanical aperture varying mechanism mentioned above physically covers the upper and lower portions (non-photographing areas) of the finder field of view so as not to be exposed, whereas the compulsive exposure mechanism compulsively exposes the non-photographing areas. It should be appreciated that the exposed non-photographing areas and the not exposed non-photographing areas are equivalent to each other in that there is no image therein.

As mentioned above, even if a picture is taken in the normal whole photographing frame of the film in the panoramic shot mode, an elongated panoramic photograph can be obtained by designating a specific frame which, upon printing, should be enlarged into a panoramic picture. Another solution would be to write discriminatory information in the film frame explaining that the frame is taken in the panoramic mode.

It is possible to more properly indicate the photographing range by varying the physical size of the field frame in addition to the variation of the finder magnification.

To this end, according to the present invention, there is provided a zoom finder for varying magnification thereof by moving variable power lens groups, comprising a field frame varying mechanism for changing the size of a field frame, so that the finder field of view can be varied in accordance with the change in size of the field frame by the field frame varying mechanism and the change of the finder magnification.

The magnification varying mechanism and the field frame varying mechanism can be driven in accordance with the focal length of the zoom photographing optical system.

The present disclosure relates to subject matter contained in Japanese patent application No. 2-73126 (filed on Mar. 22, 1990) and Japanese patent application No. 2-164481 (filed on Jun. 22, 1990) which are expressly incorporated herein by reference in its entirety.

BRIEF DESCRIPTION OF THE DRAWINGS

The invention will be described below in detail with reference to the accompanying drawings, in which:

FIG. 3 is an exploded perspective view of a main part of a view finder according to the present invention;

FIG. 5 is a perspective view of a photographing aperture varying mechanism for the photographing range of a normal shot and a panoramic shot in a zoom photographing optical system;

FIG. 21 is a back view of a camera with an open back cover thereof, showing a compulsive exposure mechanism of an outside area of a normal photographing range according to another aspect of the present invention;

DESCRIPTION OF THE PREFERRED EMBODIMENTS

FIGS. 1A through 11 show the first embodiment of the present invention. The illustrated embodiment is applied to a camera having a panoramic shot mode.

Figure 7:
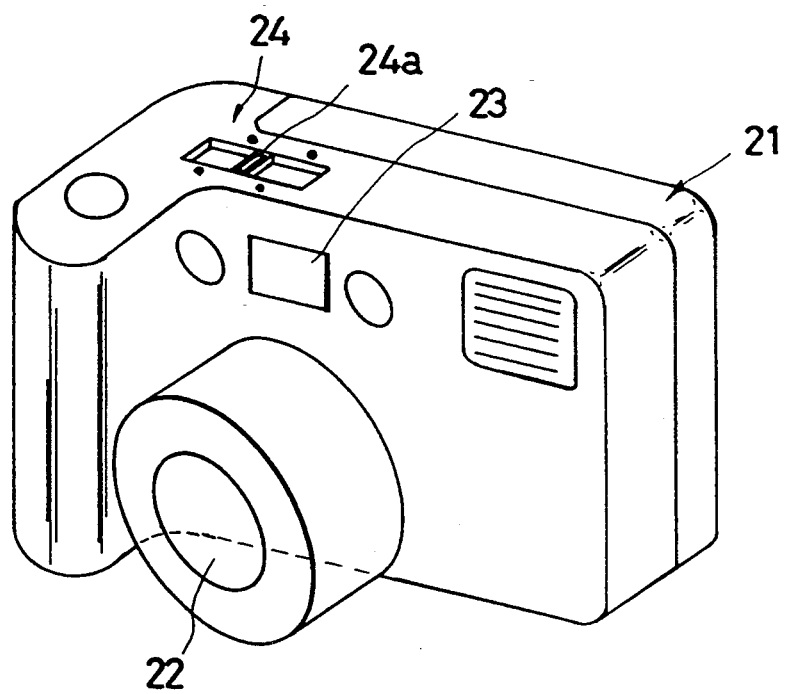
FIG. 7 is a perspective view of a camera in which a panoramic shot can be taken.

The first embodiment is applied to a camera in which not only the switching between the normal shot and the panoramic shot, can be effected but also a parallax correction at the macro mode can be effected. A camera 21 of the present invention has a zoom finder system 23 which is disposed directly above a zoom photographing optical system 22, as shown in FIG. 7. The arrangement of the zoom finder system 23 above the zoom photographing optical system 22 causes a parallax in the vertical direction.

Figure 8:
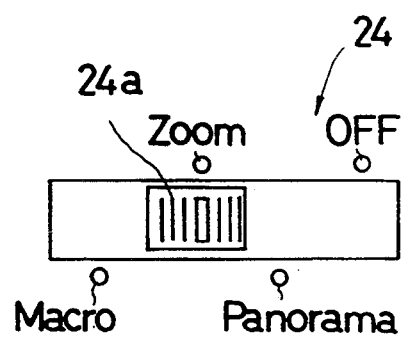
FIG. 8 is a plan view of a mode selection switch provided in the camera shown in FIG. 7.

The camera 21 has a mode selection switch 24, as shown in FIG. 8. The mode selection switch 24 has a slide knob 24a which selects a power off position OFF, a panoramic shot mode PANORAMA, a zoom shot mode ZOOM and a macro mode MACRO.

Figure 9:
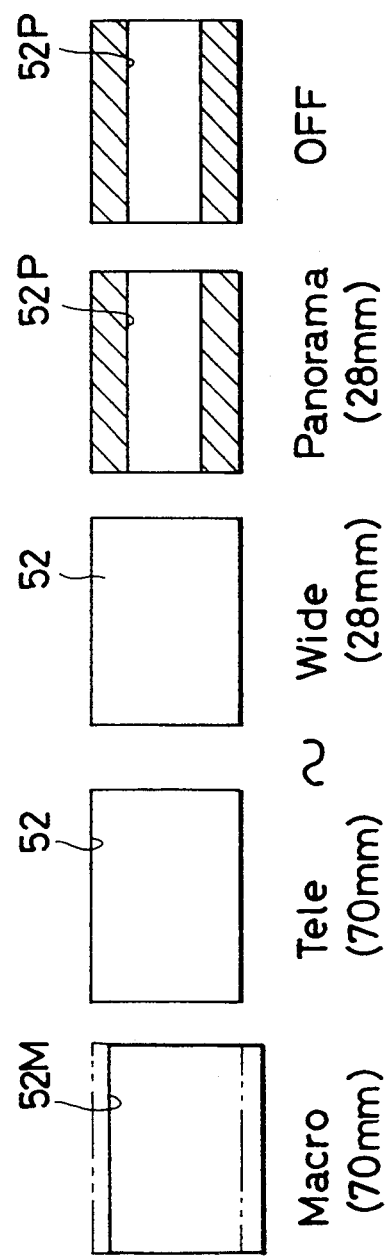
FIG. 9 illustrates front elevational views of a field of view which varies.

FIG. 9 shows examples of the field of view of the finder obtained by the zoom finder system 23. In the illustrated embodiment, the focal length of the zoom photographing optical system 22 changes from 28 mm (WIDE) to 70 mm (TELE). The transfer to the panoramic shot mode can be made at the wide extremity without varying the focal length (i.e., 28 mm). Similarly, at the tele extremity, the transfer to the macro photographing mode can be made without changing the focal length (i.e., 70 mm). There is no change in the size of the field of view 52 for the finder between TELE and WIDE. The whole field of view 52 is shifted downwardly to a macro finder field of view 52M to correct the parallax at MACRO. Conversely, at PANORAMA, the vertically contracted panorama field of view 52P is obtained to correspond to a ratio between the vertical and horizontal frame sides of the panoramic shot.

Figure 6A:
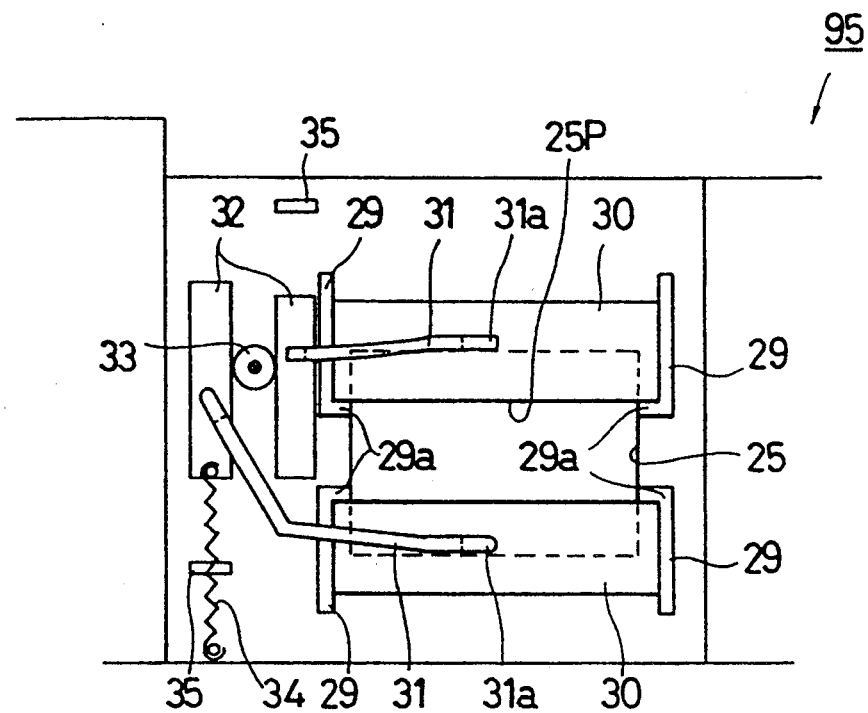
FIGS. 6A and 6B are front elevational views of the photographing aperture varying mechanism shown in FIG. 5, shown in different operational positions.
Figure 6B:
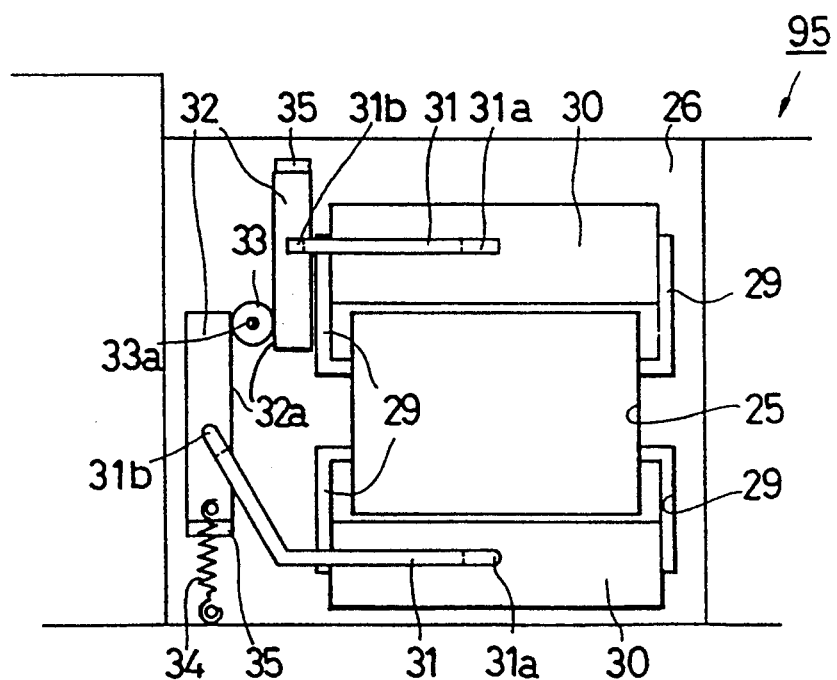

FIGS. 5, 6A and 6B show a photographing aperture varying mechanism 95 for mechanically switching the size of the photographing aperture between the normal shot and the panoramic shot. A camera body 26, having a photographing aperture 25, is provided on its opposite ends with a film patrone chamber 27 and a spool chamber 28 of a film winding spool. The aperture 25 determines the photographing range (size of a film frame to be taken) at the normal shot.

A pair of light intercepting plate guides 29 are provided on the upper and lower sides of the aperture 25, respectively, on the front surface of the body 26. The light intercepting plate guides 29 guide a pair of upper and lower light intercepting guide plates 30 so as to move up and down (in the vertical direction). The light intercepting plates 30 can selectively occupy a retracted position in which the plates 30 are located out of the aperture 25 as shown in FIG. 6B, and an operative position in which the plates 30 come into contact with stops 29a of the light intercepting plate guides 29 as shown in FIG. 6A. In the operative position, the light intercepting plates 30 partially cover the upper and lower portions of the aperture 25 defining the panoramic shot aperture 25P.

The pair of light intercepting plates 30 are connected to leaf springs 31 at the ends indicated 31a. The leaf springs 31 are secured to a pair of upper and lower rack plates 32 at the ends indicated 31b. The rack plates 32 have racks 32a opposed to each other, so that the racks 32a are therein mesh with a common pinion 33 located in. The rack plates 32 are continuously biased to come away from one another by a tensile spring 34. Namely, the light intercepting plates 30 are continuously biased towards the retracted position. The outward movements of the rack plates 32 towards the retracted position are restricted by respective stops 35 provided on the camera body 26. The elasticity of the leaf springs 31 ensures that the light intercepting plates 30 come into contact with the respective stops 29a in the panoramic shot mode shown in FIG. 6A and are retracted from the aperture 25 at the normal shot position shown in FIG. 6B.

The zoom photographing optical system 22 has a cam ring 36 which is provided on its outer periphery with a zoom gear 36a and a panorama sector gear 36b, as shown in FIG. 5. The zoom gear 36a is in mesh with a pinion 38a which is driven by a reversible motor 37 through a reduction gear train 38. The panorama sector gear 36b can be engaged by a pinion 39 which is coaxially connected to the pinion 33 through a shaft 33a.

Figure 10:
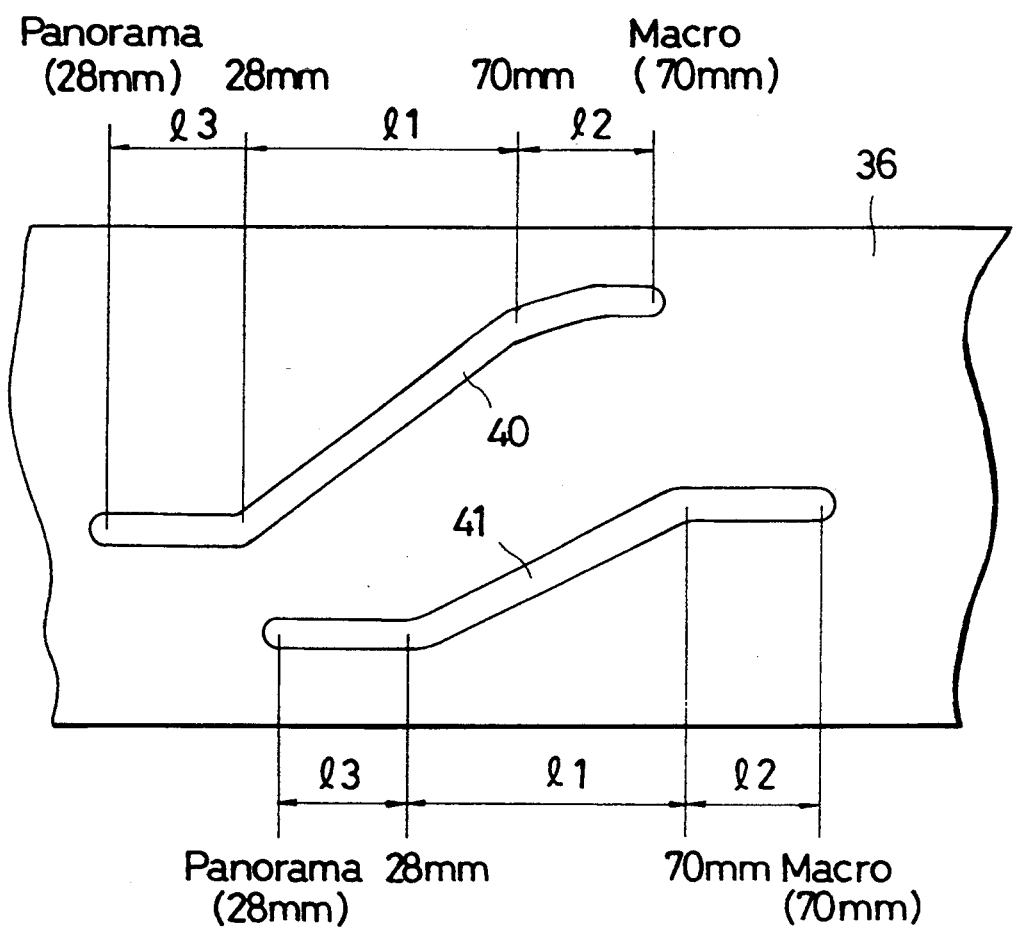
FIG. 10 is a developed view of a cam ring of a zoom photographing optical system.

FIG. 10 is a developed view of the cam ring 36. The cam ring 36 has two cam grooves 40 and 41 which drive the zoom photographing optical system which consists of two front and rear lens groups in the simplest construction in the illustrated embodiment. The cam groove 40 moves the front lens group (not shown) which linearly moves in the optical axis direction when the cam ring 36 rotates. Similarly, the cam groove 41 moves the rear lens group (not shown) which linearly moves in the optical axis direction. Each of the cam grooves 40 and 41 has a zoom section 11, a macro transfer section 12 and a panorama transfer section 13, wherein the mauo transfer section 12 and the panorama transfer section 13 are on opposite side of the zoom section 11. The cam ring 36 moves the front and rear lens groups to change the focal length within the range of 28~70 mm in the zooming section 11. The cam ring advances only the front lens group by a predetermined distance to make the macro shot possible in the macro transfer section 12, and idles so as not to move the front and rear lens groups in the panorama transfer section 13, respectively.

The cam ring 36 is not limited to the illustration in the drawings. Namely, the cam ring 36 can be replaced with any element which rotates to change the focal length of the zoom photographing optical system. The subject of the present invention is not directed to a concrete arrangement of the zoom photographing optical system.

The panorama sector gear 36b is engaged by the pinion 39 during the idling of the cam ring 36 in the panorama transfer section 13 to rotate the pinion 33. When the pinion 33 rotates, the rack plates 32 come close to each other so that the light intercepting plates 30 move until they come into contact with the respective stops 29a, as shown in FIG. 6A. Thus, the panoramic shot aperture 25P is obtained. In the zoom section 11 and the macro transfer section 12 of the cam ring 36 in which no engagement of the panorama sector gear 36b with the pinion 39 takes place, the rack plates 32 are pulled by the tensile spring 34, so that the light intercepting plates 30 are retracted from the aperture 25, as shown in FIG. 6B.

The zoom gear 36a of the cam ring 36 is also engaged by an association gear 42 of the zoom finder system 23. The association gear 42 is secured to a shaft 42a which extends rearwardly and is connected to a reduction gear train 20. The final pinion 43 (FIG. 3) of the reduction gear train is in mesh with the rack 19 of the cam plate 16 of the zoom finder system 23.

The following discussion will be addressed to the zoom finder system 23 (FIGS. 1A through 4).

The zoom finder system 23 includes first, second, third, and fourth lens groups L1, L2, L3 and L4, located in this order from the object side. A field frame varying mechanism 51 is provided between the third and fourth lens groups L3 and L4 to vary the field of view 52 while changing the ratio in size between the vertical and horizontal frame sides. A Porro prism P is also provided between the third and fourth lens groups L3 and L4.

The first and fourth lens groups L1 and L4 are immovable lenses, and the second and third lens groups L2 and L3 are movable lenses for varying the magnification (power). The Porro prism P inverts a real image formed by the objective optical system constituted by the first, second and third lens groups L1, L2 and L3, in both the vertical and horizontal directions, so that the inverted image can be observed through the eye piece optical system constituted by the Porro prism P and the eye piece (fourth lens group) L4. The field frame varying mechanism 51 which constitutes one of the most significant features of the present invention is provided on the image forming plane of the objective optical system.

The second and third lens groups L2 and L3 are secured to movable frames 11 and 12 which are provided thereon with drive pins 13 and 14, respectively. A supporting plate 15 which supports the cam plate 16 and allows it to move laterally, is located above the second and third lens groups L2 and L3. The cam plate 16 has cam grooves 17 and 18 in which the drive pins 13 and 14 are fitted. The cam plate 16 is functionally connected to the cam ring 36 through the rack 19, the final pinion 43, the reduction gear train 20, the association gear 42, and the zoom gear 36a, so that the cam plate 16 can be laterally moved in association with the transfer of the zoom photographing optical system 22 into the panoramic shot mode, the zoom operation and the macro transfer operation thereof.

Figure 4:
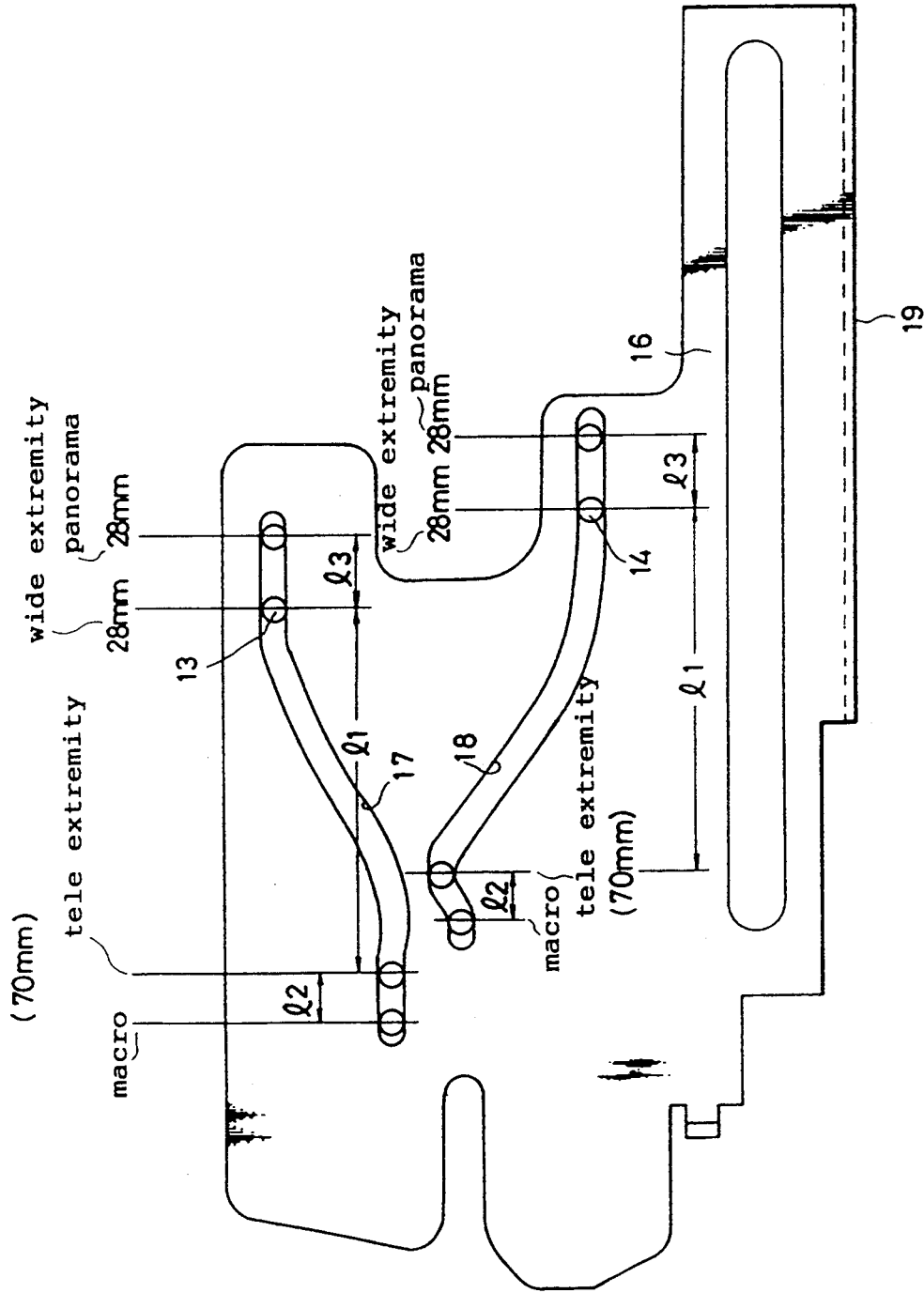
FIG. 4 is a plan view of a cam plate of a view finder shown in FIG. 3.

As can be seen in FIG. 4, both of the cam grooves 17 and 18 have a panorama transfer section 13, a zoom section 11 and a macro transfer section 12 to move the movable frame 11 (second lens group L2) and the movable frame (third lens group L3). The panorama transfer section 13 is straight to maintain the focal length of the zoom photographing lens system 22 at the shortest focal length (28 mm in the illustrated embodiment). On the other hand, the cam grooves 17 and 18 are inclined in the zoom section 11 (28~70 mm), so that the movement of the variable power lens groups L2 and L3 in the optical axis direction varies the magnification thereof in accordance with the magnification of the zoom photographing optical system 22.

The cam grooves 17 and 18 are inclined in the direction opposite to that of the zoom section 11, in the macro transfer section 12, so that the finder magnification adjusted by the power lens groups L2 and L3 is smaller than that at the longest focal length (70 mm).

The zoom sections 11, the macro transfer sections 12 and the panorama transfer sections 13 of the cam grooves 17 and 18 on the cam plate 16 correspond to the zoom sections 11, the macro transfer sections 12 and the panorama transfer sections 13 of the cam grooves 40 and 41 of the cam ring 36, respectively.

As shown in FIGS. 1A through 1C and FIGS. 2A through 2C, the field frame varying mechanism 51 includes a pair of movable field frame plates 53A and 53B made of thin plates, an annular cam member 55 which drives the movable field frame plates 53A and 53B, and a pinion 57 which engages with a gear 56 located on the outer periphery of the annular cam member 55 which rotates the latter. The pinion 57 constitutes another final gear of the reduction gear train 20 to rotate synchronously with the first final gear 43 which drives the cam plate 16. The annular cam member 55 has a center opening 55a which has a center located on the optical axis O of the zoom finder optical system 23. The center opening 55a of the annular cam member 55 is sufficiently larger than the field of view 52 defined by the movable field frame plates 53A and 53B.

Figure 1A:
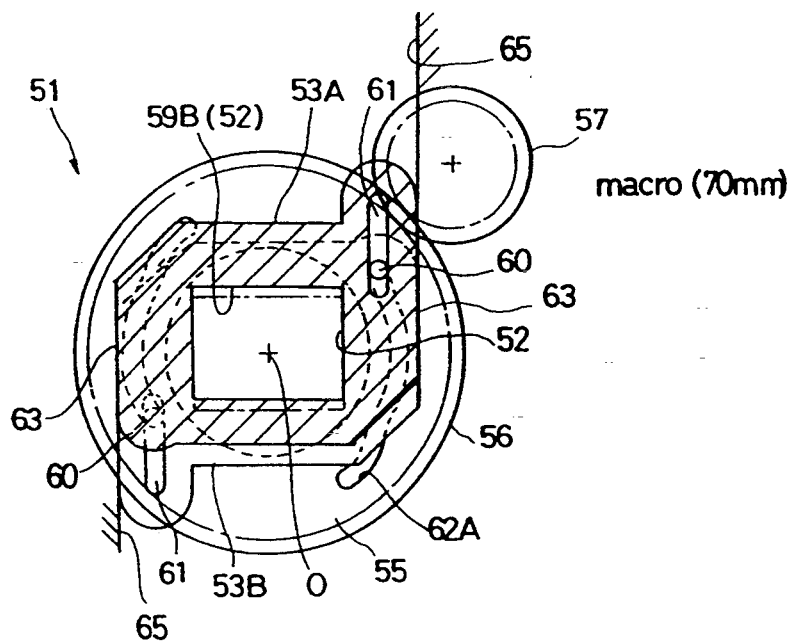
FIGS. 1A, 1B and 1C are front elevational views of a view finder in which a panoramic shot can be taken, shown in different operational positions, according to the present invention.
Figure 1B:
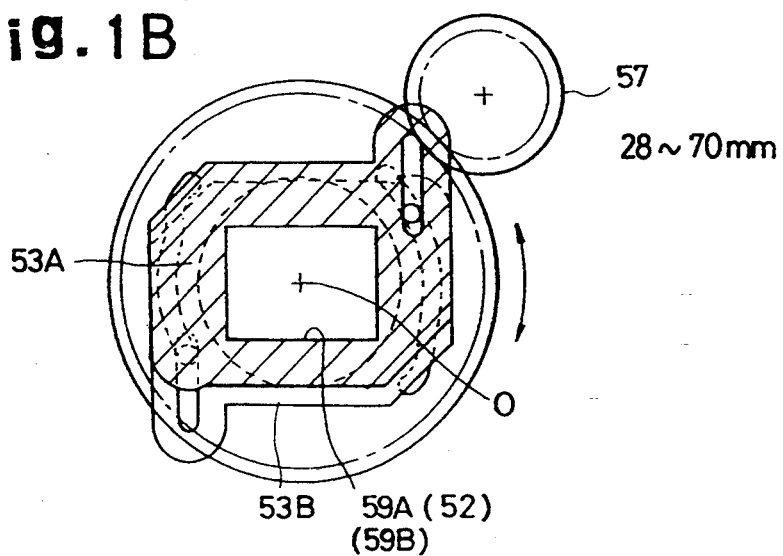
Figure 1C:
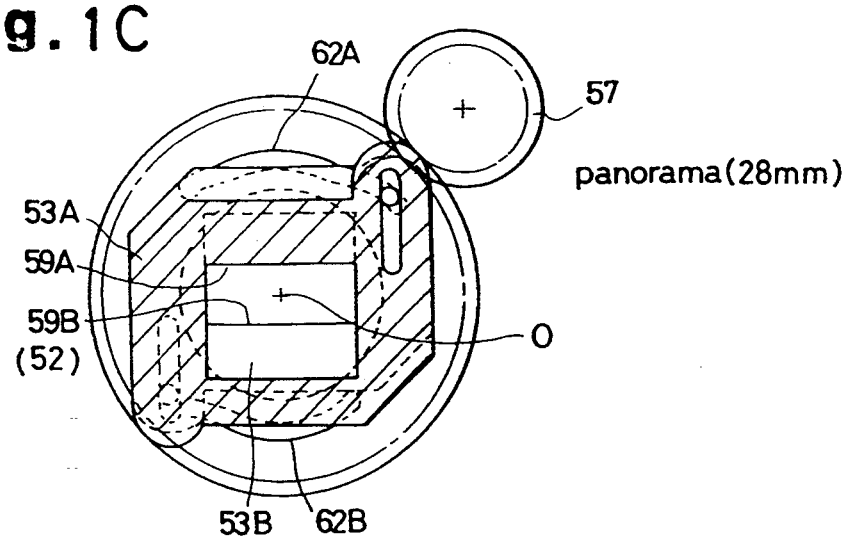

The movable field frame plates 53A and 53B which are identical to each other in shape are in a point symmetrical arrangement with respect to the optical axis O. In FIGS. 1A through 1C, only the movable field frame plate 53A is hatched for clarification. The movable field frame plates 53A and 53B have rectangular openings 59A and 59B which partially overlap. As can be seen in FIGS. 1A through 1C and FIGS. 2A through 2C, the right and left sides of the rectangular opening 59A of the movable field plate 53A are exactly flush with the corresponding right and left sides of the rectangular opening 59B of the movable field plate 53B. The movable field frame plates 53A and 53B are movable in the vertical direction in order to change the size of the aperture 52 in the vertical direction. Namely, the amount of overlap of the rectangular openings 59A and 59B is varied by the movement of the movable field frame plates 53A and 53B in the vertical direction.

Figure 2A:
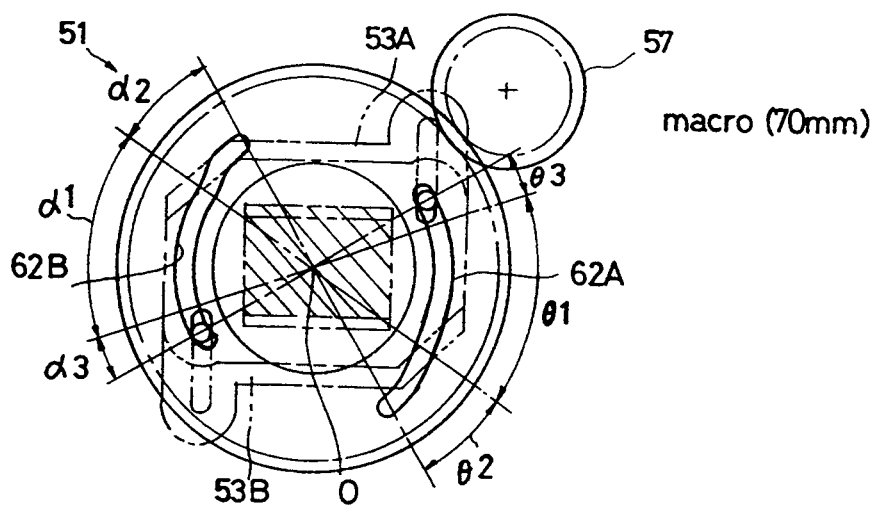
FIGS. 2A, 2B and 2C are front elevational views of a view finder shown in FIGS. 1A through 1C, in which cam grooves are exaggerated, shown in different operational positions, according to the present invention.
Figure 2B:
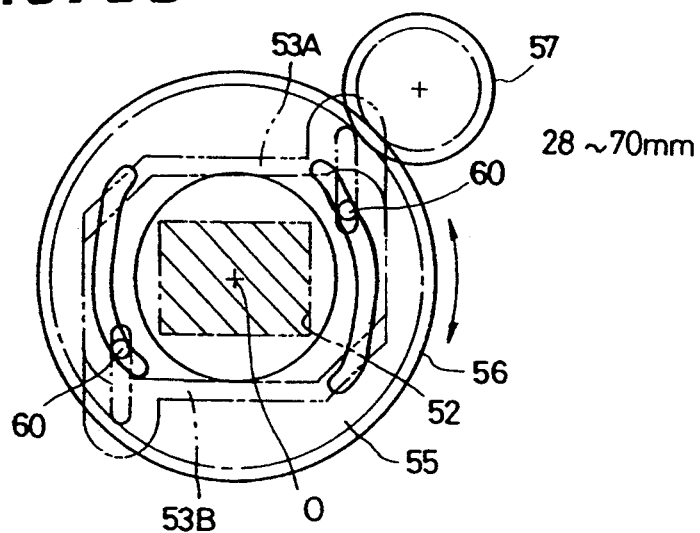
Figure 2C:
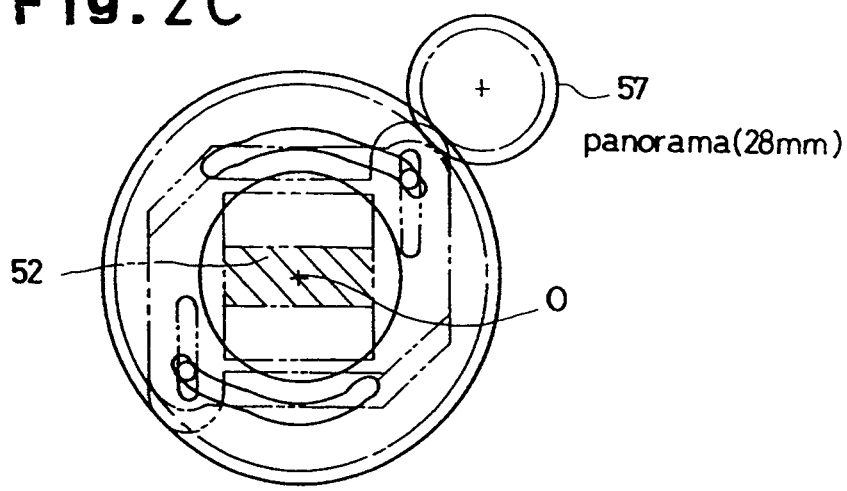

The movable field frame plates 53A and 53B have drive pins 60 provided thereon which are fitted in linear movement guide grooves 61 formed in the field frame plates 53B and 53A, and in cam grooves 62A and 62B formed in the annular cam member 55, respectively. The field frame plates 53A and 53B have guide surfaces 63 parallel with the linear movement guide grooves 61 with which stationary guide surfaces 65 provided on an immovable guide member (not shown) come into contact. The guide mechanism formed by the stationary guide surfaces 65 and the linear movement guide grooves 61, restricts the movement of the field frame plates 53A and 53B in the vertical direction, so that the movement of the field frame plates 53A and 53B changes the length of the field of view 52 in the vertical direction to change the ratio in length between the vertical and horizontal sides of the field of view 52. In FIGS. 2A through 2C, the field of view 52 is hatched.

The cam grooves 62A and 62B are asymmetrical. The cam groove 62A has an arched zoom section $\theta 1$ (FIG. 2A) with its center on the optical axis O, a field frame reduction section $\theta 2$ connected to one of the ends of the zoom section $\theta 1$, and a field frame upward movement section $\theta 3$ connected to the other end of the zoom section $\theta 1$. On the other hand, the cam groove 62B has an arched zoom section $\alpha 1$ (FIG. 2A) with its center on the optical axis O, a field frame reduction section $\alpha 2$ connected to one of the ends of the zoom section $\alpha 1$, and a field frame upward movement section $\alpha 3$ connected to the other end of the zoom section $\alpha 1$.

The zoom sections $\alpha 1$ and $\theta 1$, and the field frame reduction sections $\alpha 2$ and $\theta 2$ have a point symmetry relation with respect to the optical axis O, respectively. The field frame upward movement section $\theta 3$ of the cam groove 62A is slightly curved with respect to the zoom section $\theta 1$ so that it will come away from the optical axis O in the radial direction. The field frame upward movement section $\alpha 3$ of the cam groove 62B is slightly curved with respective to the zoom section $\alpha 1$ by the same amount of curve as that of the field frame upward movement section $\theta 3$ so that it will come close to the optical axis O in the radial direction.

The panorama transfer section 13 of the cam plate 16 corresponds to the field frame reduction sections $\alpha 2$ and $\theta 2$; the zoom section 11 to the zoom sections $\alpha 1$ and $\theta 1$; and the macro transfer section 12 to the field frame upward movement sections $\alpha 3$ and $\theta 3$, respectively.

When the reversible motor 37 is rotated in the forward or reverse direction, the cam ring 36 rotates in the forward or reverse direction. As a result, in the zoom section 11 of the cam ring 36, the focal length of the zoom photographing lens system 22 is changed within the range of 28~70 mm. In the zoom section 11, since the panorama sector gear 36b of the cam ring 36 is not engaged by the pinion 39, the aperture 25 is kept in the largest size. The rotation of the cam ring 36 is converted to the linear movement of the cam plate 16 through the zoom gear 36a, the association gear 42, the reduction gear train 20, the final pinion 43, and the rack 19. As a result, the cam plate 16 changes the focal length of the zoom finder system 23 in accordance with the focal length of the zoom photographing optical system 22 in the zoom section 11.

The rotation of the association gear 42 is also transmitted to the annular cam member 55 through the pinion 57 and the gear 56. As a result, the zoom sections $\theta 1$ and $\alpha 1$ of the cam groove 62A and 62B of the annular cam member 55 hold the largest field of view 52 defined by the rectangular openings 59A and 59B, as shown in FIG. 2B.

When the cam ring 36 comes to the panorama transfer section 13 from the wide extremity (28 mm), the cam ring 36 idles without changing the focal length of the zoom photographing optical system 22, that is, without moving the variable power lenses of the zoom photographing optical system 22. By the idling of the cam ring 36, the panorama sector gear 36b engages with the pinion 39, so that the rack plates 32 come close to each other through the pinion 33. Consequently, the light intercepting plates 30 come close to each other to change the aperture to the panoramic shot aperture 25P, as mentioned before. Simultaneously, the annular cam member 55 of the field frame varying mechanism 51 guides the drive pin 60 with the help of the cam grooves 62A and 62B in the field frame reduction sections $\theta 2$ and $\alpha 2$. As a result, the field frame plates 53A and 53B move to decrease the length of the field of view 52 in the vertical direction, as shown in FIG. 1C. Namely, the vertically contracted field of view 52P is obtained, as shown in FIGS. 2C and 9. Thus, a photographer who observes the field of view through the eye piece L4 can observe a field image similar to the panoramic photography which is actually taken by the zoom photographing optical system 22. Note that there is no displacement of the variable power lenses of the zoom finder system 23 in the panorama transfer section 13 of the cam plate 16, and accordingly, no change in the magnification of the image of the zoom finder system 23 occurs.

At the macro transfer sections 12 of the cam grooves 40 and 41 of the cam ring 36 beyond the tele extremity (70 mm), only the front lens group of the zoom photographing lens system 22 is advanced by a predetermined distance to come to the macro shot position. Since the panorama sector gear 36b of the cam ring 36 is not engaged by the pinion 39 in the macro transfer section 12, the largest aperture 25 is maintained. The rotation of the cam ring 36 is converted to the linear movement of the cam plate 16 through the zoom gear 36a, the association gear 42, the reduction gear train 20, the final pinion 43, and the rack 19, so that the cam plate 16 moves the movable variable power lens groups L2 and L3 rearwardly by the corresponding macro transfer sections 12 of the cam grooves 17 and 18 to decrease the magnification of the zoom finder system 23. The decrease of the magnification of the zoom finder system 23 mentioned above is carried out to include the photographing range at the macro mode within the field of view.

The rotation of the reduction gear train 20 is transmitted to the annular cam member 55 through the pinion 57, so that the movable field frame plate 53A is moved upwardly by a predetermined displacement by the field frame upward movement section $\theta 3$ of the cam groove 62A of the annular cam member 55. At the same time, the movable field frame plate 53B is moved upwardly by a predetermined displacement by the field frame upward movement section $\alpha 3$ of the cam groove 62B. As a result, the largest field of view 52 is moved upwardly by a predetermined displacement from the position shown at the two-dotted and dashed line in FIG. 1A. Since an image of the field of view 52, which is inverted in the vertical and horizontal directions, is observed through the eye piece optical system of the zoom finder system 23, when the aperture 52 is moved upwardly, the image of the macro finder field of view 52M (FIG. 9) which is moved downwardly can be observed through the zoom finder system 23. Consequently, the parallax between the zoom photographing lens system 22 and the zoom finder system 23 is corrected.

Although the afore-mentioned embodiment is applied to a camera having a macro mode, the present invention can be applied to a camera not having a macro function.

Figure 11:
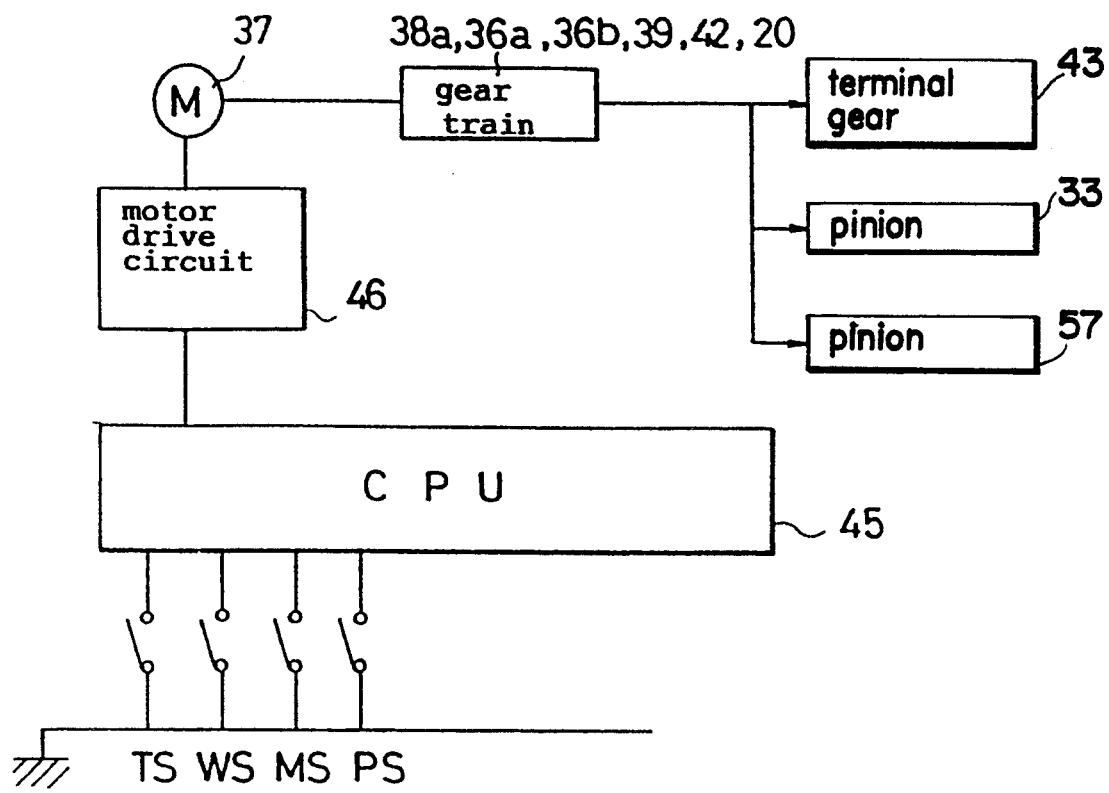
FIG. 11 is a block diagram of a driving system of a zoom photographing optical system and a zoom finder optical system.

FIG. 11 shows a block diagram of a control system for performing the operations mentioned above. Signals from a telephoto switch TS, a wide-angle switch WS, a macro switch MS and a panorama switch PS, which constitute input signals of the mode selection switch 24, command the direction of the rotation and the rotational displacement of the reversible motor 37 and are provided as input to a CPU 45. In response to these signals, the CPU 45 drives the reversible motor 37 in the forward or reverse direction, through a motor drive circuit 46, which drives in turn the terminal gear 43 (zoom finder system 23), the pinion 33 (aperture varying mechanism 95) and the pinion 57 (field frame varying mechanism 51) through a gear train consisting of a pinion 38a, zoom gear 36a, panorama sector gear 36b, pinion 39, association gear 42, and reduction gear train 20.

Note that the telephoto switch TS and the wide-angle switch WS are switched ON and OFF by an operational member (not shown), and the macro switch MS and the panorama switch PS are switched ON and OFF by the slide movement of the slide switch 24 shown in FIG. 8, respectively.

FIGS. 12 through 16 show two different embodiments of the present invention in which upon taking a panoramic shot, the outside area of the panoramic shot area of the film plane is compulsively exposed, or a discrimination information exposure portion which represents the panoramic shot is formed in the outside area of the panoramic shot area, instead of the mechanical switching of the photographing range between the normal shot and the panoramic shot, as mentioned in the previous embodiment.

Figure 12:
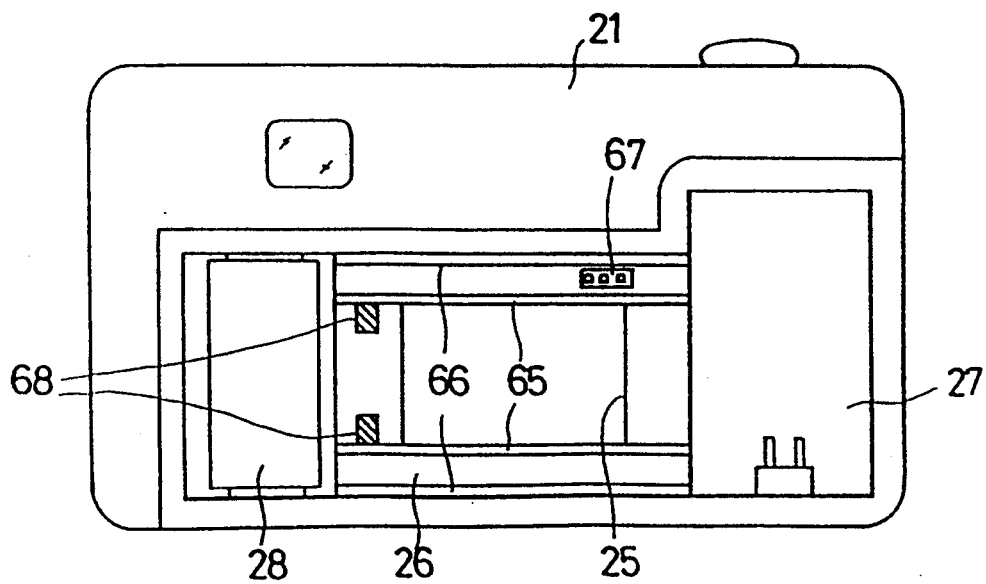
FIG. 12 is a back view of a camera with a removed back cover, showing a compulsive exposure mechanism of an outside area of a normal photographing range according to the present invention.

A camera 21 has a film parrone chamber 27 and a spool chamber 28, as shown in FIG. 12. As is well known, an inner rail 65 and an outer rail 66 are formed on the rear surface of a camera body 26 which does not include the aperture varying mechanism 95, so that the rails 65 and 66 are located on the upper and lower portions of the aperture 25. A sprocket 67 is provided between the inner rail 65 and the outer rail 66, so that the teeth 67a of the sprocket 67 are in mesh with the perforations P of the film F. Between the edge of the aperture 25 adjacent to the spool chamber 28 are provided a pair of light emitters (compulsive exposure devices) 68, each having a vertical length that corresponds to a certain width of the upper or lower area 69 (FIG. 13) of the film F. The light emitters 68 emit light for the compulsive exposing of the associated upper and lower areas 69 of the film F during the travel thereof.

Figure 15:
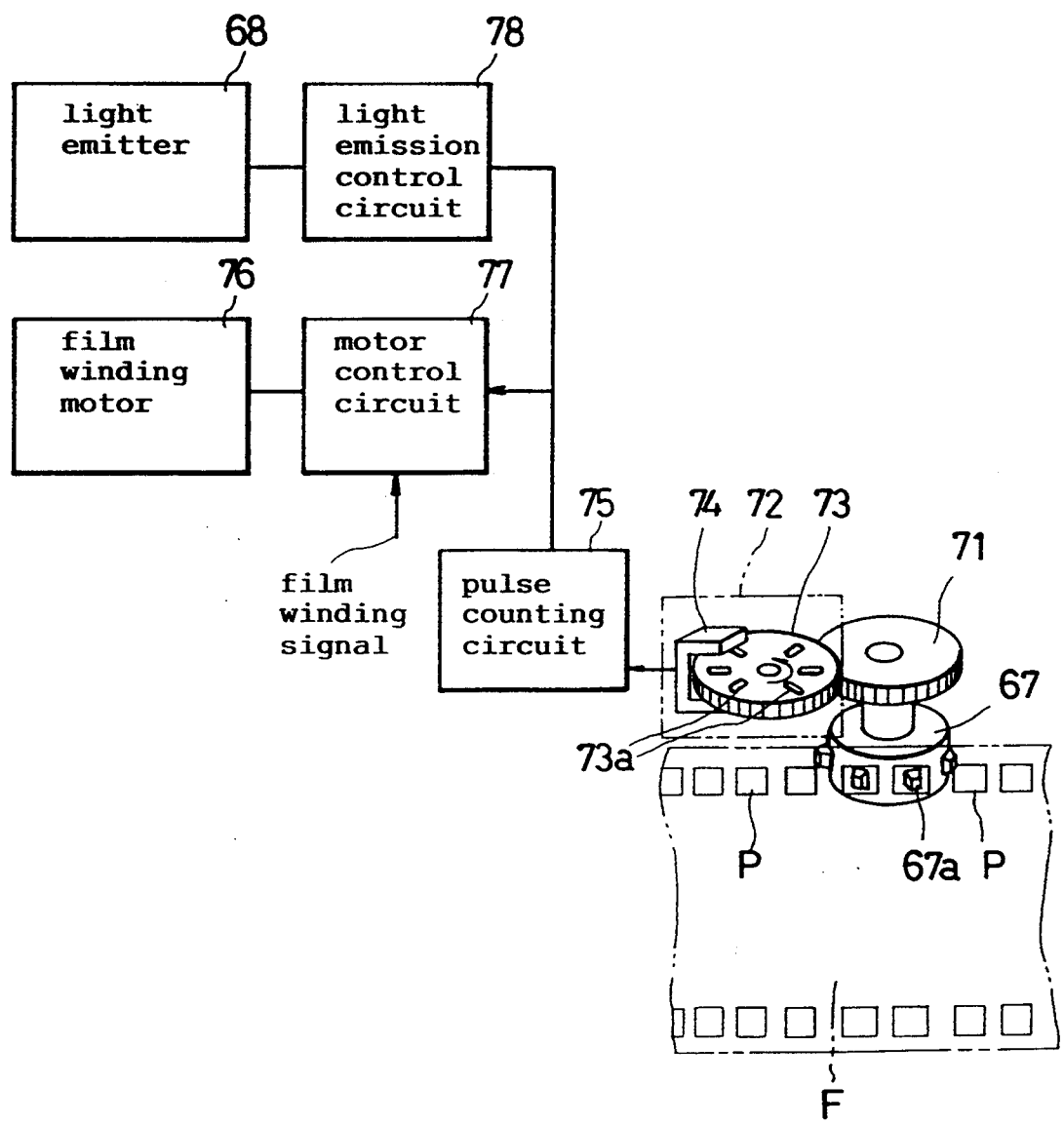
FIG. 15 is a block diagram showing a connection of a control system of a compulsive exposure mechanism of the outside area of a normal photographing range shown in FIG. 12.

The sprocket 67 is coaxially connected to gear 71 which meshes with a gear 73 of a pulse generator 72, as shown in FIG. 15. The gear 73 is provided with a plurality of radial slits 73a of equiangular distance. The gear 73 lies in a plane between a light emitter and a light receiver of a photocoupler 74 per se known, so that the gear 73 intermittently intercepts light emitted from the light emitter towards the light receiver of the photocoupler 74. Namely, the photocoupler 74 generates one pulse every time the slit 73a passes the photocoupler 74. In the illustrated embodiment, the number and the distance of the slits 73a are determined so that one pulse generated by the pulse generator 72 corresponds to one perforation P of the film F. As is well known, one frame of the 35 mm film corresponds to eight perforations P, and accordingly, when the film is advanced by one frame, eight pulses are generated.

The photocoupler 74 is connected to a pulse counting circuit 75 which is connected to a motor control circuit 77 for controlling a film winding motor 76 and a light emission control circuit 78 for controlling the light emitters 68.

According to this embodiment, in the case that a picture is taken at a panoramic shot mode, the upper and lower compulsive exposure areas 69 of the film F which are formed on the outside areas of the panoramic photographing area PP are compulsively exposed when the taken frame of the film is wound, so that there is no need for the physical variation of the size of the aperture 25.

Figure 16:
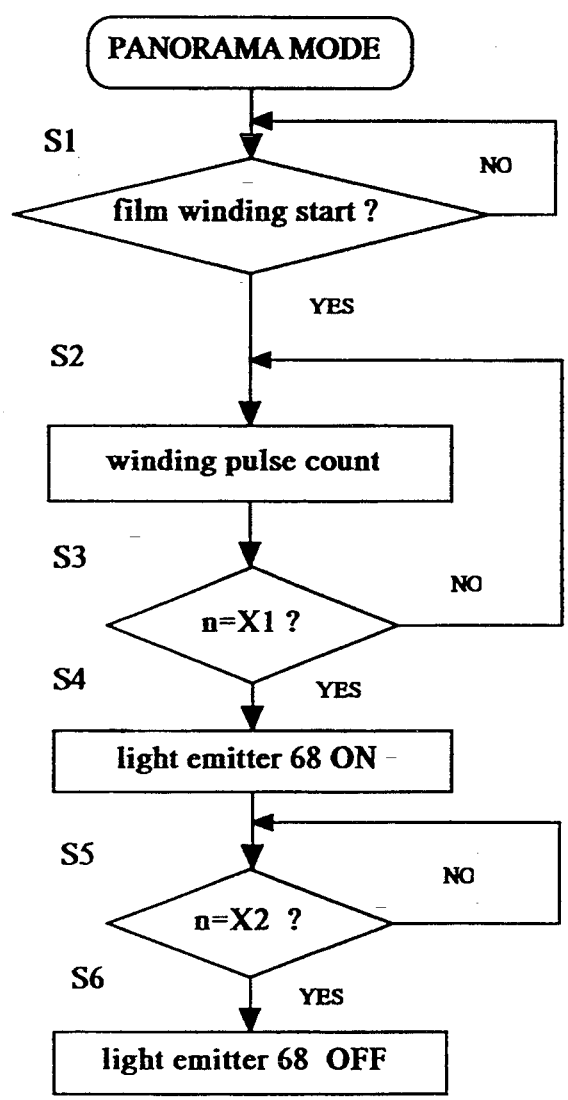
FIG. 16 is a flow chart of operations of a panoramic shot of a compulsive exposure mechanism of an outside area of a normal photographing range shown in FIGS. 12 and 15.

The operation of the arrangement shown in FIG. 16 is as follows.

When the film is wound after the panoramic shot is finished, the pulse counting circuit 75 counts the number n of pulses generated by the pulse generator 72 (steps S1 and S2). As mentioned above, one pulse is generated for one perforation P of the film F, when the counted number n of pulses reaches a predetermined value $X_1$ (e.g., n=1 or 2), the light emission control circuit 78 causes the light emitters 68 to emit light (steps S3 and S4). Thereafter, when the counted number n reaches a predetermined value $X_2$ (e.g., n=7 or 8), the emission of the light emitters 68 is stopped (steps S5 and S6).

Needless to say, the predetermined values $X_1$ and $X_2$ mentioned above can be optionally modified. For instance, it is possible to generate a larger number of pulses for one frame of film in order to more precisely control the emission of the light emitters 68.

Figure 13:
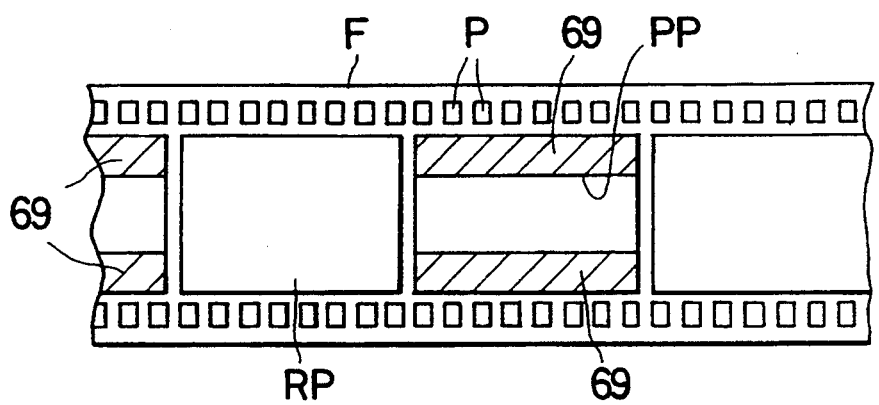
FIG. 13 is a schematic view of a film obtained by a compulsive exposure mechanism of an outside area of a normal photographing range shown in FIG. 12.

FIG. 13 schematically shows the upper and lower compulsive exposure areas 69 formed on the outside areas of the panoramic photographing area PP. According to this embodiment, it is possible to alternately arrange the panoramic frames (panoramic photographing areas) PP and the normal photographing frames RP in the same film.

Figure 14:
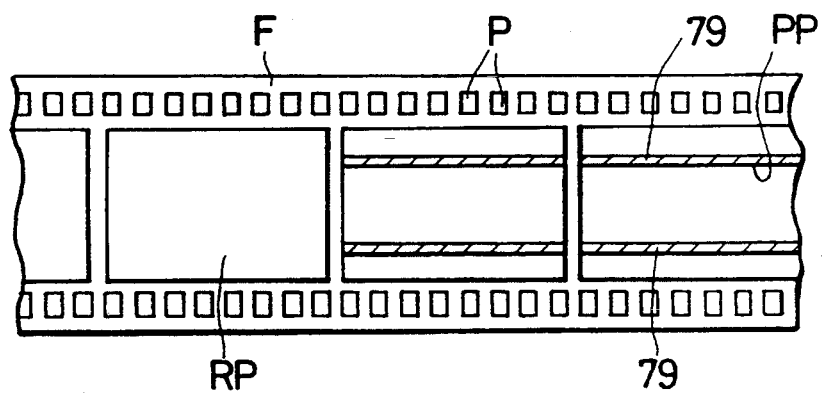
FIG. 14 is a schematic view of a film obtained by another compulsive exposure mechanism, according to another aspect of the present invention.

FIG. 14 shows a modification of FIG. 13, in which the discrimination information exposure portions 79 are formed instead of the compulsive exposure areas 69 in FIG. 13. The discrimination information exposure portions 79 can be formed by the use of smaller light emitters 68 which emit point light.

In the embodiments shown in FIGS. 13 and 14, a printer in a laboratory detects the presence of the compulsive exposure areas 69 or the discrimination information exposure portions 79 on the taken frames of the film F to recognize the panoramic shot frame. When the panoramic shot frame is detected, the panoramic photographic range PP is printed on photographic paper in accordance with the enlargement for the panoramic shot frame.

It should be noted that it is not necessary to form the compulsive exposure areas 69 or the discrimination information exposure portions 79 on the whole length of the taken frames of the film F to recognize the panoramic shot frame.

The light emitters 68 can be provided on a back cover 91 of the camera 21 rather than on the camera body 26 as shown in FIG. 21. In FIG. 21, a pair of upper and lower small light passing holes 68' are provided on a pressure plate 92 of the back cover 91 of the camera 21 to correspond to the upper and lower boundary portions of the panoramic photographic area. A light emitter 93 is disposed behind the light passing holes 68'. The light emitter 93 is switched ON to emit light to form the discrimination information exposure portions through the light passing holes 68' before the film is wound and after the panoramic shot is taken.

FIGS. 17 through 20 show still another embodiment of the present invention, in which not only the finder magnification but also the field frame are varied in the zooming range of the zoom photographing optical system, to thereby indicate a more appropriate photographing range. In this embodiment, no panoramic photographing function is provided unlike the above mentioned embodiments.

Figure 17A:
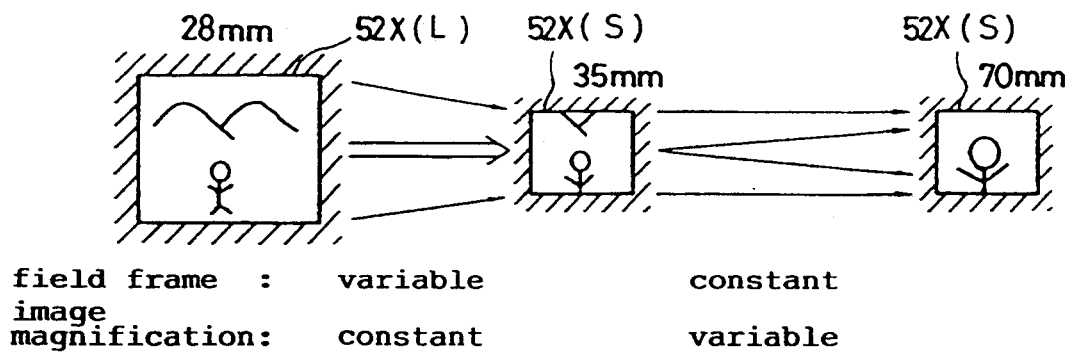
FIGS. 17A, 17B and 17C are explanatory views showing variable finder magnifications and variable field frames of a finder, according to another aspect of the present invention.

One of the most important features of the embodiment shown in FIGS. 17 through 20 resides in the change of the size of the field of view 52X of the finder from a large size (L) to a small size (S) without changing the finder magnification in a specific focal length range (e.g., 28~35 mm) and the change of the finder magnification in accordance with the focal length of the photographing optical system without changing the field of view 52X which is maintained at the small size (S) in the remaining focal length range (35~70 mm), for example in a camera in which the focal length of the zoom photographing optical system 22 changes within the range of 28~70 mm, as shown in FIG. 17A.

Figure 17B:
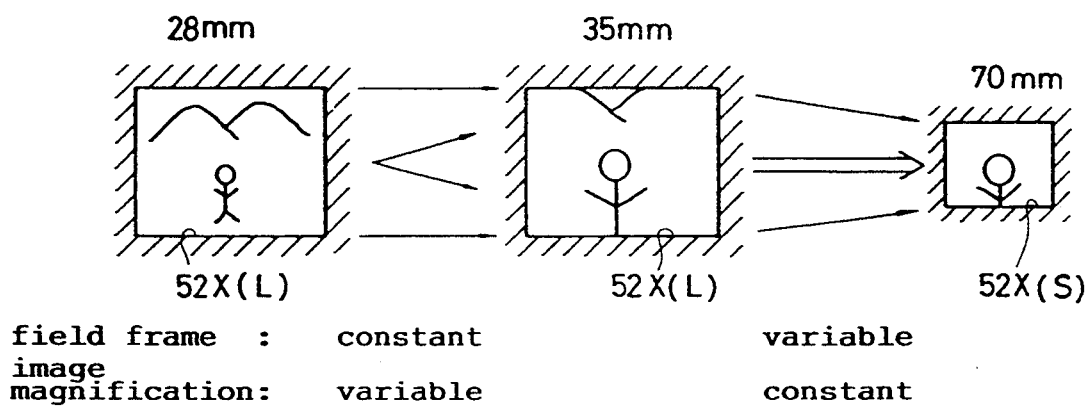

Alternatively, as can be seen in FIG. 17B, on one hand, the finder magnification is varied while the field of view 52X is fixed to have the large size (L) in the focal length of 28~35 mm, and on the other hand, the field of view 52X is changed from L to S without changing the finder magnification in the focal length of 35~70 mm.

Figure 17C:
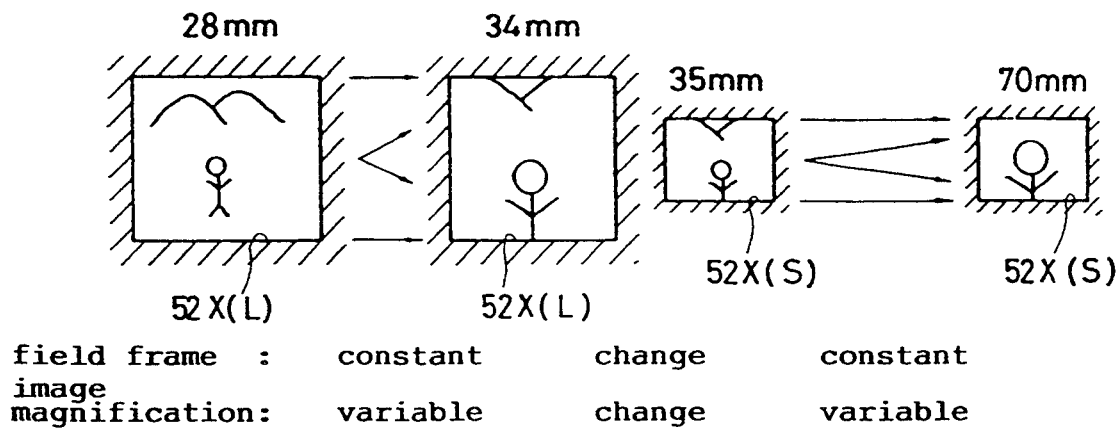

Furthermore, as can be seen from FIG. 17C, it is also possible to fix the field of view 52X at the large size L and change the finder magnification in a focal length area shorter than a critical point which is of value for example between 34 mm and 35 mm. In this alternative, the finder magnification is varied after the field of view 52X is changed from L to S at which the field of view is then fixed in the focal length of 35~70 mm.

The following discussion will be directed to a specific example which realizes the finder field of view as shown in FIG. 17A, with reference to FIGS. 18A through 20. The arrangement shown in FIGS. 18A through 20 is applied to a camera which has both the zoom photographing optical system and the zoom finder optical system and which has the macro function, similar to the previous embodiments. Also, this arrangement is featured by the observation of the macro photographing range through the finder where the zoom finder system 23 is located above the zoom photographing optical system 22 in an inclined direction. The zoom photographing optical system 22 and the zoom finder system 23 are similar to those in the previous embodiments.

In the arrangement shown in FIGS. 18A through 20, the field frame varying mechanism 51 is replaced with another field frame varying mechanism 80.

As shown in FIG. 20, the cam grooves 17 and 18 of the cam plate 16 have zooming sections 11 and macro transfer sections 12 for moving the movable frame 11 (second lens group L2) and the movable frame 12 (third lens group L3). In this embodiment, the physical size of the finder field of view 52X is varied by the field frame varying mechanism 80 in a specific focal length range 11'(e.g., 28~35 mm), i.e., the zoom section on the short focal length side, without changing the image magnification, rather than simply changing the finder magnification in accordance with the focal length of the zoom photographing optical system in the zoom section 11. In the macro transfer section 12, the magnification of the finder optical system 23 is decreased and the photographing range is indicated by the field of view 52X determined by the field frame varying mechanism 80.

That is, the cam grooves 17 and 18 have linear grooves in the zooming sections 11' of the short focal length side in which the focal length of the zoom photographing optical system is 28~35 mm, so that no movement of the variable power lens groups L2 and L3 takes place. Namely, the finder magnification is constant. On the other hand, the cam grooves 17 and 18 have inclined grooves in the zooming sections 11" of the long focal length side of 35~70 mm, so that the variable power lens groups L2 and L3 move in the optical axis direction to change the magnification thereof in accordance with the magnification of the zoom photographing optical system. The inclinations of the cam grooves 17 and 18 in the macro transfer sections 12 are the same as those of the cam grooves shown in FIG. 4.

The field frame varying mechanism 80 includes a pair of movable field frame plates 81A and 81B made of thin plates, an annular cam member 82 which drives the movable field frame plates 81A and 81B, and the above mentioned pinion 57 which engages with a gear 83 provided on the outer periphery of the annular cam member 82 to rotate the latter.

The annular cam member 82 has a center opening 82a with its center located on the optical axis O of the zoom finder optical system 23. The center opening 82a of the annular cam member 82 is sufficiently larger than the field of view 52X defined by the movable field frame plates 81A and 81B.

Figure 18A:
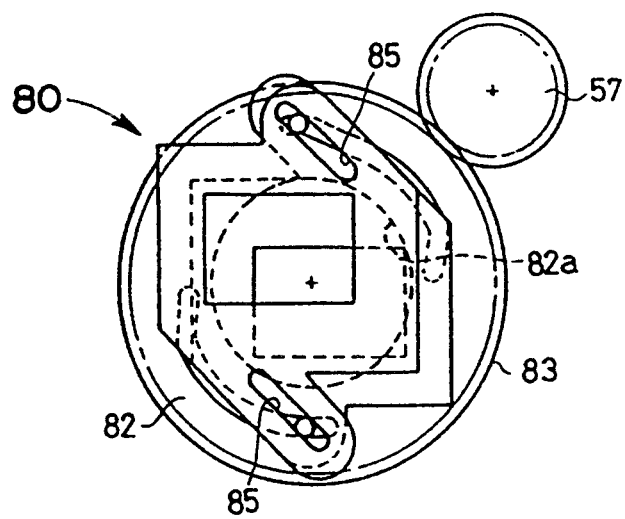
FIGS. 18A, 18B and 18C are front elevational views of a field frame varying mechanism of a view finder, shown in different operational positions, according to the present invention.
Figure 18B:
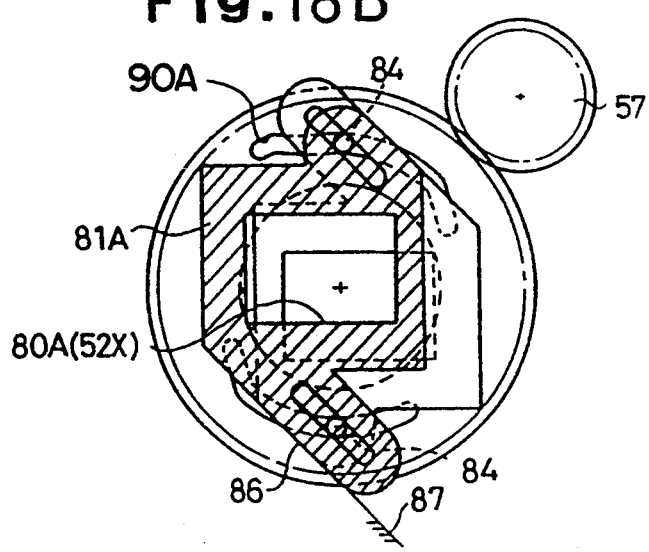

The movable field frame plates 81A and 81B which are identical to each other in shape are in a point symmetrical arrangement with respect to the optical axis O. In FIG. 18B, only the movable field frame plate 81A is hatched and in FIG. 18C, only the movable field frame plate 81B is hatched, in both cases this is done only for clarification. The movable field frame plates 81A and 81B have rectangular openings 80A and 80B which partially overlap. The field of view 52X is defined by the two adjacent sides of the rectangular opening 80A and the two adjacent sides of the rectangular opening 80B, diametrically opposed to the two adjacent sides of the rectangular opening 80A.

Figure 18C:
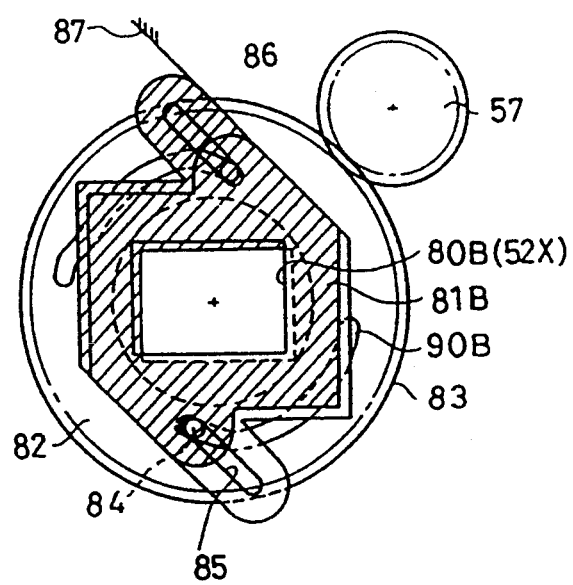
Figure 19A:
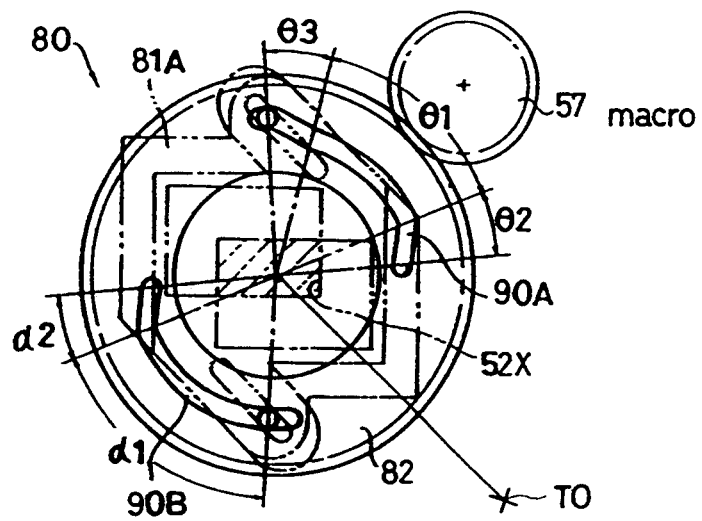
FIGS. 19A, 19B and 19C are front elevational views of a view finder shown in FIGS. 18A through 18C, in which cam grooves are exaggerated, shown in different operational positions, according to the present invention; and, FIG. 20 is a plan view of a cam plate used in an embodiment shown in FIGS. 18A through 18C.
Figure 19B:
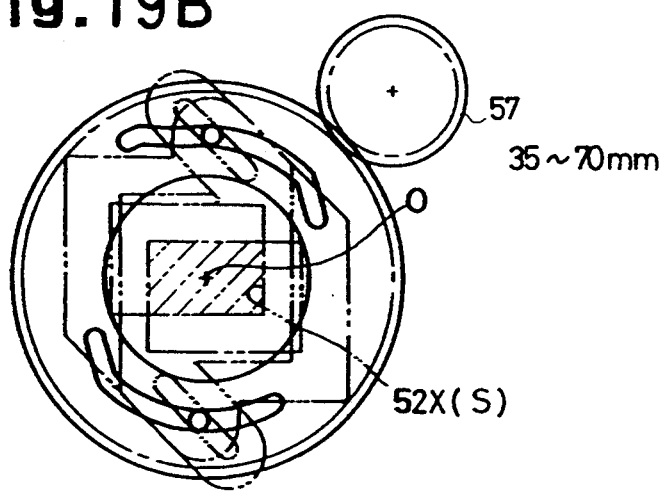
Figure 19C:
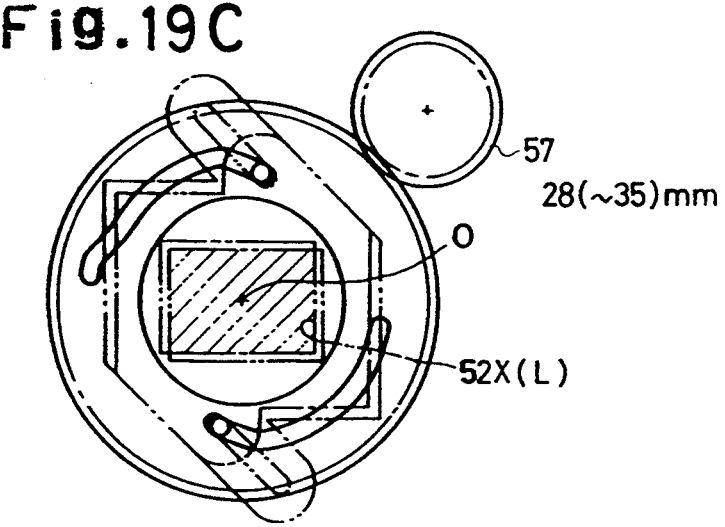

The movable field frame plate 81A and 81B have drive pins 84 provided thereon which are fitted in linear movement guide grooves 85 formed in a stationary guide member (not shown) separate from the annular cam member 82 and in cam grooves 90A and 90B formed in the annular cam member 82, respectively. The field frame plates 81A and 81B have guide surfaces 86 parallel with the linear movement guide grooves 85 with which stationary guide surfaces 87 provided on the stationary guide member come into contact. The guide mechanism formed by the stationary guide surfaces 87 and the linear movement guide grooves 85 restricts the movement of the field frame plates 81A and 81B in an inclined direction at 45° with respect to each side of the rectangular openings 80A and 80B. Consequently, when the movable field frame plates 81A and 81B move, the field of view 52X is varied, as shown in FIGS. 18A through 18C. In FIGS. 19A through 19C, the field of view 52X is hatched.

The cam grooves 90A and 90B are asymmetrical. The cam groove 90A has an arched zoom section $\theta1$ (FIG. 19A) with its center on the optical axis O, a field frame enlargement section $\theta2$ connected to one of the ends of the zoom section $\theta1$, and a field frame reduction section $\theta3$ connected to the other end of the zoom section $\theta1$. On the other hand, the cam groove 90B has an arched zoom macro section $\alpha1$ (FIG. 19A) having a center on the optical axis O and a field frame enlargement section $\alpha2$ connected to one of the ends of the zoom macro section $\alpha1$. The zoom macro section $\alpha1$, the zoom section $\theta1$ and the field frame reduction section $\theta3$ satisfy the following equation:

$$\alpha1 = \theta1 + \theta3.$$

The zoom section 11' of the cam plate 16 corresponds to the field frame enlargement sections $\alpha2$ and $\theta2$; the zoom section 11" to the zoom section $\theta1$ and the zoom macro section $\alpha1$; and the macro transfer section 12 to the field frame reduction section $\theta3$, respectively.

When the annular cam member 82 rotates through the pinion 57, the movable field frame plates 81A and 81B are moved by the field frame enlargement sections $\theta2$ and $\alpha2$ of the cam grooves 90A and 90B of the annular cam member 82 in the focal length of the zoom photographing optical system of 28~35 mm. As a result, the field of view 52X defined by the rectangular openings 80A and 80B is continuously varied between the large size L and the small size S. In this moment, the focal length of the zoom finder system 23 does not change because of the presence of the zoom sections 11' of the short focal length side of the cam grooves 17 and 18 of the cam plate 16.

On the other hand, in the focal length of the zoom photographing optical system of 35~70 mm, due to the zoom section $\theta1$ and the zoom macro section $\alpha1$ of the cam grooves 90A and 90B, no change of the field of view 52X occurs. However, the focal length of the zoom finder system 23 is varied by the zoom sections 11" of the cam grooves 17 and 18.

Further movement from 70 mm to the macro photographing area causes the movable field frame plate 81A only to move in a direction to reduce the field of view 52X due to the field frame reduction section $\theta3$ of the cam groove 90A. There is no movement of the field frame plate 81B due to the zoom macro section α1. The direction of the movement of the field frame plate 81A (the direction of shift of the field of view 52X) is the direction in which the field frame plate 81A comes away from the optical axis TO (FIG. 19A) of the zoom photographing optical system 22. This is because the inverted image of the field of view 52X is observed as an erected image through the eye piece lens system constituted by the Porro prism P and the fourth lens group L4. During this time, the focal length of the zoom finder system 23 is changed towards the short focal length side to enlarge the field of view by the macro transfer sections 12 of the cam grooves 17 and 18. The displacement of the field frame plate 81A is determined so that the field of view 52X represents the macro photographing range in the enlarged field of view.

Although the above mentioned embodiments are applied to a camera having a macro function, the present invention can be applied to a camera without a macro function. Furthermore, although the finder of the above mentioned embodiment is of a type that the magnification is reduced in the macro photographing range, the invention can be applied to a finder in which the same magnification as that at the telephoto extremity is maintained in the macro photographing range.

Finally, the arrangement for achieving the change of the physical size of the field of view 52X and the magnification of the zoom finder system 23 in combination, as shown in FIG. 17B or 17C can be easily realized, similar to FIG. 17A.

We claim:

1. A camera having a view finder comprising:
   a field frame varying mechanism comprising means for varying a ratio in length between the longitudinal and lateral sides of a finder field frame of said view finder by changing a dimension of one of said longitudinal and lateral sides of said field frame while the other dimension of said field frame remains unchanged;
   an aperture varying mechanism for varying a physical size of an aperture for exposure of a film, in accordance with the ratio in length between the longitudinal and lateral sides of said finder field frame, said aperture varying mechanism comprising a pair of light intercepting plates which are linearly movable, with respect to the camera, in a plane parallel to a plane of the film to vary said physical size of said aperture; wherein said field varying mechanism, by selectively blocking predetermined portions of said finder frame, selectively determines a normal field of view which represents a normal photographing range and a panoramic field of view which has a contracted lateral side length compared with the normal field of view and represents a panoramic photographic range; and
   means mechanically associating said field frame varying mechanism and said aperture varying mechanism with each other so that said finder field of said view finder and said physical size of said aperture vary to correspond to one another.

2. A camera according to claim 1, further comprising an aperture varying mechanism for varying a physical size of an aperture for exposure of a film, in accordance with the ratio in length between the longitudinal and lateral sides of said finder field frame.

3. A camera according to claim 1, wherein said field frame varying mechanism selectively determines a normal field of view which represents a normal photographing range and a panoramic field of view which has a contracted lateral side length compared with the normal field of view and represents a panoramic photographic range.

4. A camera according to claim 2, wherein said aperture varying mechanism comprises a body which has an aperture determining the normal photographing range, a pair of light intercepting plates which close the upper and lower portions of certain widths of said aperture, and a movement control mechanism which controls the movement of the light intercepting plates so as to selectively occupy a retracted position in which the light intercepting plates are retracted from the said aperture and an operative position in which the light intercepting plates partially close the upper and lower portions of said aperture.

5. A camera according to claim 4, wherein said camera has a normal shot mode and a panoramic shot mode.

6. A camera according to claim 5, wherein said movement control mechanism holds the light intercepting plates in the retracted position at the normal shot mode, and advances the light intercepting plates to the operative position at the panoramic shot mode, respectively.

7. A camera according to claim 3, further comprising light emitters corresponding to the upper and lower portions of the film to compulsively expose the associated upper and lower portions of the film, so that the upper and lower portions of the film define compulsive exposure areas.

8. A camera according to claim 7, wherein said light emitters are arranged between an aperture defining the normal photographing range and a spool chamber for winding the film.

9. A camera according to claim 7, wherein said compulsive exposure areas are constituted by the upper and lower portions of the panoramic photographic range in panoramic shot frames of film.

10. A camera according to claim 7, wherein each of said light emitters is comprised of a point light source, so that said compulsive exposure areas are in the form of elongated bands corresponding to upper and lower boundary portions of the panoramic photographing range.

11. A camera according to claim 1, said aperture varying mechanism further comprising a member which defines said aperture determining the normal photographing range and a movement control mechanism which controls movement of said light intercepting plates so as to selectively occupy a retracted positioned in which said light intercepting plates are retracted from said aperture and an operative position in which said light intercepting plates partially close the upper and lower portions of said aperture.

12. A camera according to claim 2, said aperture varying mechanism comprising means for moving a pair of light intercepting plates linearly, with respect to the camera, within a plane parallel to a plane of the film to vary a physical size of said aperture.

13. A camera having a view finder comprising a field frame varying mechanism for varying a ratio in length between the longitudinal and lateral sides of a finder field frame of said view finder, wherein said field frame varying mechanism comprises a pair of field frame plates which are linearly movable, with respect to the camera, in a plane to define the field of view of said view finder, and a drive mechanism which varies the ratio in length between the longitudinal and lateral sides of the field of view by driving said field frame plates in accordance with a change in size of a picture image area of said camera by changing a dimension of one of the longitudinal or lateral sides of said finder field frame while the other dimension remains unchanged, without affecting a film frame feed increment of the camera.

14. A camera according to claim 13, wherein said movable field frame plates have rectangular openings which partially overlap to define the field of view of said finder.

15. A camera according to claim 14, further comprising a rotatable annular cam member which has cam grooves to control the movement of the movable field frame plates.

16. A camera according to claim 15, wherein said annular cam member has a circular central opening which is large enough to contain the rectangular openings of the movable field plates.

17. A camera comprising:
- a zoom photographing optical system for forming an image of light transmitted through a photographic lens group onto a film;
- aperture varying means for mechanically switching an exposure area of the film between a normal exposure area corresponding to a normal photographing range and a panoramic exposure area which is contracted to be smaller than the normal photographing range, said panoramic exposure area having a contracted lateral side length compared with the normal exposure area and corresponding to a panoramic photographing range, said aperture varying means mechanically switching the exposure area in association with zooming of said zooming photographing optical system and comprising a pair of light intercepting plates and means for moving said light intercepting plates linearly within a plane parallel to a plane of the film; and
- a viewfinder for selectively providing a field of view defining a normal field of view and a panoramic field of view in mechanical association with switching of an exposure area by said aperture varying means.

18. A camera according to claim 17, wherein said aperture varying means comprises a body which has an aperture determining the normal photographing range, a pair of light intercepting plates which cover the upper and lower portions of certain widths of said aperture, and a movement control mechanism which control the movement of the light intercepting plates so as to selectively occupy a retracted position in which the light intercepting plates are retracted from said aperture and an operative position in which the light intercepting plates partially close the upper and lower portions of said aperture.

19. A camera according to claim 18, wherein said camera has a normal shot mode and a panoramic shot mode.

20. A camera according to claim 19, wherein said movement control mechanism holds the light intercepting plates in the retracted position at the normal shot mode and advances the light intercepting plates to the operative position at the panoramic shot mode, respectively.

21. The camera according to claim 20, said view finder selectively providing a field of view defining a normal field of view and a panoramic field of view by selectively blocking predetermined portions of a finder field frame of said viewfinder to change a dimension of one of the longitudinal or lateral sides of the finder field frame while the other dimension of the finder field frame remains unchanged.

22. A zoom finder comprising:
- variable power lens groups for varying the zoom finder magnification,
- a field frame varying mechanism for changing a size of a field frame, whereby the finder field of view can be varied in accordance with the change of the field frame by said field frame varying mechanism and the change of the finder magnification; and
- means for defining the physical size of an aperture to correspond to the size of said finder field of view.

23. A zoom finder according to claim 22, wherein said field frame varying mechanism comprises a pair of field frame plates movable in relation to each other to define the field of view of said finder, and a drive mechanism which varies the ratio in length between the longitudinal and lateral sides of the field of view defined by the driving field frame plates.

24. A zoom finder according to claim 23, wherein said movable field frame plates have rectangular openings which partially overlap to define the field of view of said finder.

25. A zoom finder according to claim 23, further comprising a rotatable annular cam member which has cam grooves to control the movement of the movable field frame plates.

26. A zoom finder according to claim 25, wherein said annular cam member has a circular central opening which is large enough to contain the rectangular openings of the movable field plates.

27. A zoom lens camera comprising:
- a zoom photographing optical system;
- a zoom finder system separate from said zoom photographing optical system, wherein said zoom finder system includes a magnification varying mechanism which moves variable power lens groups to vary the finder magnification and a field frame varying mechanism which varies the size of a field frame, said magnification varying mechanism and said field frame varying mechanism being driven in accordance with the focal length of said zoom photographing optical system; and
- means for defining the physical size of an aperture to correspond to the size resulting in the variance in the field of view of said zoom finder system.

28. A camera comprising:
- a photographing optical system for forming an image of light transmitted through a photographing lens group onto a film;
- switching means for setting an exposure of the film, said switching means comprising means operable from outside of a camera body;
- aperture varying means for mechanically switching the exposure area of the film, in association with said switching means, between a normal exposure area corresponding to a normal photographing range or a panoramic exposure area smaller than the normal photographing range and corresponding to a panoramic photographing range, said aperture varying means comprising means for moving a pair of light intercepting plates linearly within a plane parallel to a plane of the film to vary the exposure area of the film;
- a view finder selectively defining a variable size field of view; and means for changing the size of the field of view in mechanical association with mechanical switching of the exposure area of the film by said aperture varying means by selectively blocking predetermined portions of said finder field of view to change a dimension of one of a longitudinal or lateral sides of said finder field of view while the dimension of the other one of said longitudinal or lateral sides remains unchanged.

29. A camera according to claim 28, said aperture varying means further comprising a member which defines an aperture determining the normal photographing range and a movement control mechanism which controls the movement of said light intercepting plates so as to selectively occupy a retracted position in which said light intercepting plates are retracted from said aperture and an operative position in which said light intercepting plates partially close the upper and lower portions of said aperture.

30. A camera comprising:
a photographic optical system for forming an image of light transmitted through a photographing lens group onto a film and aperture varying means for mechanically switching an exposure area of the film between a normal exposure area corresponding to a normal photographing range and a panoramic exposure area corresponding to a panoramic photographing range which is contracted to be smaller than the normal photographing range, said panoramic exposure area having a contracted lateral side length compared with the normal exposure area, said aperture varying means comprising a pair of light intercepting plates and means for moving said pair of light intercepting plates linearly, with respect to the camera, within a plane parallel to a plane of the film.

* * * * *

UNITED STATES PATENT AND TRADEMARK OFFICE
CERTIFICATE OF CORRECTION

PATENT NO. : 5,345,285
DATED : September 6, 1994
INVENTOR(S) : Sachio HASUSHITA et al.

It is certified that error appears in the above-indentified patent and that said Letters Patent is hereby corrected as shown below:

At column 16, line 13 (claim 4, line 9), change "the said" to --- said---.

Signed and Sealed this

Fifteenth Day of August, 1995

Attest:

BRUCE LEHMAN

Attesting Officer    Commissioner of Patents and Trademarks